(12) United States Patent
Wilsher et al.

(10) Patent No.: US 10,057,734 B2
(45) Date of Patent: *Aug. 21, 2018

(54) SYSTEM AND METHOD FOR TRANSMITTING AND RECEIVING MEDIA MESSAGES

(71) Applicant: Twilio, Inc., San Francisco, CA (US)

(72) Inventors: Thomas Wilsher, San Francisco, CA (US); Patrick Malatack, San Francisco, CA (US); Rajiv Puranik, San Francisco, CA (US); Cheuk To Law, San Francisco, CA (US)

(73) Assignee: TWILIO INC., San Francisco, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/964,325

(22) Filed: Dec. 9, 2015

(65) Prior Publication Data

US 2016/0094962 A1  Mar. 31, 2016

Related U.S. Application Data

(63) Continuation of application No. 14/273,393, filed on May 8, 2014, now Pat. No. 9,240,966.

(Continued)

(51) Int. Cl.
*G06F 17/00* (2006.01)
*H04W 4/14* (2009.01)
(Continued)

(52) U.S. Cl.
CPC ............. *H04W 4/14* (2013.01); *H04L 12/287* (2013.01); *H04L 12/2856* (2013.01);
(Continued)

(58) Field of Classification Search
CPC ................. G06F 17/24; G06F 17/2247; G06F 17/30017; G06F 17/30861;
(Continued)

(56) References Cited

U.S. PATENT DOCUMENTS 5,274,700 A  12/1993 Gechter et al.
5,526,416 A  6/1996 Dezonno et al.
(Continued)

FOREIGN PATENT DOCUMENTS

DE  1684587 A  3/1971
EP  0282126 A  9/1988
(Continued)

OTHER PUBLICATIONS

Complaint for Patent Infringement, *Telinit Technologies, LLC* v. *Twilio Inc.*, dated Oct. 12, 2012.
(Continued)

*Primary Examiner* — Quoc A Tran
(74) *Attorney, Agent, or Firm* — Schwegman Lundberg & Woessner, P.A.

(57) ABSTRACT

Systems and methods for a communication platform that includes receiving a media message request; obtaining a set of web content resources associated with the media message request; rendering the set of web content resources; converting the rendered set of web content resources into a media resource; and transmitting the media resource to a destination according to the media message request.

20 Claims, 22 Drawing Sheets

Related U.S. Application Data

(60) Provisional application No. 61/836,937, filed on Jun. 19, 2013, provisional application No. 61/879,006, filed on Sep. 17, 2013.

(51) Int. Cl.
| | |
|---|---|
| *H04L 12/58* | (2006.01) |
| *H04L 12/28* | (2006.01) |
| *H04L 29/08* | (2006.01) |
| *H04N 21/2343* | (2011.01) |
| *H04L 29/06* | (2006.01) |
| *G06F 17/24* | (2006.01) |
| *G06F 17/22* | (2006.01) |
| *G06F 17/30* | (2006.01) |

(52) U.S. Cl.
CPC ........ *H04L 29/08144* (2013.01); *H04L 51/10* (2013.01); *H04L 51/18* (2013.01); *H04L 65/602* (2013.01); *H04L 67/02* (2013.01); *H04N 21/2343* (2013.01); *G06F 17/2247* (2013.01); *G06F 17/24* (2013.01); *G06F 17/30017* (2013.01); *G06F 17/30861* (2013.01)

(58) Field of Classification Search
CPC ......... G06F 17/30905; H04L 29/08144; H04L 51/10; H04L 65/602; H04L 22/2343; H04L 22/2856; H04L 67/02; H04L 67/06; H04L 67/16; H04L 65/1069
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kailas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |

(56) References Cited

U.S. PATENT DOCUMENTS

| | | |
|---|---|---|
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B2 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |

(56) References Cited

U.S. PATENT DOCUMENTS

| | | |
|---|---|---|
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Martino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |

(56) References Cited

U.S. PATENT DOCUMENTS

| | | |
|---|---|---|
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Swartz |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |

(56) References Cited

U.S. PATENT DOCUMENTS

| | | |
|---|---|---|
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1* | 6/2013 | Maharajh .............. H04L 65/605 707/758 |
| 2013/0179942 A1 | 7/2013 | Caplis et al. |
| 2013/0198335 A1* | 8/2013 | Goel .............. H04N 21/234336 709/219 |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |

(56) References Cited

U.S. PATENT DOCUMENTS

| | | |
|---|---|---|
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 018489 | 2/2009 |
| WO | 2009018489 A | 2/2009 |
| WO | 2009124223 A | 10/2009 |
| WO | 2010037064 | 4/2010 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

NPL, "API Monetization Platform", 2013.
RFC 3986: Uniform Resource Identifier (URI): Generic Syntax; T. Berners-Lee, R. Fielding, L. Masinter; Jan. 2005; The Internet Society.
"Ethernet to Token ring Bridge"—Black Box Corporation, Oct. 1999 http://blackboxcanada.com/resource/files/productdetails/17044.pdf.
Kim et al. "In-service Feedback QoE Framework" 2010 Third International Conference on Communication Theory. Reliability and Quality of Service. pp. 135-138. 2010.
Matos et al. "Quality of Experience-based Routing in Multi-Service Wireless Mesh Networks" Realizing Advanced Video Optimized Wireless Networks. IEEE. pp. 7060-7065. 2012.
Tran et al. "User to User adaptive routing based on QoE" ICNS 2011: The Seventh International Conference on Networking and Services. pp. 170-177. 2011.
Wu et al. "Quality Evaluation in Peer-to-Peer IPTV Services" Data Traffic and Monitoring Analysis, LNCS 7754. pp. 302-319. 2013.
Abu-Lebdeh et al. "A 3GPP Evolved Packet Core-Based Architecture for QoS-Enabled Mobile Video Surveillance Applications". 2012 Third International Conference on the Network of the Future (NOF). 21-23, Nov. 2012. pp. 1-6.
Archive Microsoft Office 365 Email | Retain Unified Archiving, 2015, GWAVA, Inc., Montreal, Canada. <http://www.gwava.com/Retain/Retain_for_Office_365.php>.
Twilio Cloud Communications—APIs for Voice, VoIP, and Text Messaging, Twilio. <http://www.twilio.com/docs/api/rest/call-feedback>.
S. barakovic and L. Skorin-Kapov. "Survey and Challenges of QoE Management Issues in Wireless Networks". 2012, pp. 1-29.
Subramanya, et al. "Digital Signatures", IEEE Potentials, Mar./Apr. 2006, pp. 5-8.

* cited by examiner

```
<?xml version="1.0" encoding="UTF-8"?>
<Response>
  <Message action="/MsgHandler.php">
    <Body>Here is your bording pass Mr. Smith!</Body>
    <Media>http://www.example.com/bordingpass/</Media>
  </Message>
</Response>
```

FIGURE 5A

```
<?xml version="1.0" encoding="UTF-8"?>
<Response>
  <Message action="/MsgHandler.php">
    <Body>I'm hungry!</Body>
    <Media>http://www.images.com/cheesesteak.png</Media>
  </Message>
</Response>
```

FIGURE 5B

Sending a message

```
https://api.example.com/2010-04-01/Accounts/AC111509BV/
Messages.json\
-d"Body=Good%20Morning%20Angela"\
-d"To=%2B14155551234"\
-d"From=%2B14155556789"\
-d"MediaUrls=http://images.example.com/hearts.png"\
-u'ACBV112113:{AuthToken}
```

```
<?xml version="1.0" encoding="UTF-8"?>
<Response>
  <Message action="/MsgHandler.php">
    <Body>I'm hungry!</Body>
    <Media>http://www.images.com/cheesesteak.png</Media>
    <Media>http://www.images.com/pizza.jpg</Media>
  </Message>
</Response>
```

FIGURE 16

SYSTEM AND METHOD FOR TRANSMITTING AND RECEIVING MEDIA MESSAGES

CROSS-REFERENCE TO RELATED APPLICATIONS

This application is a continuation of co-pending U.S. patent application Ser. No. 14/273,393, filed 8 May 2014, which claims the benefit of U.S. Provisional Application Ser. No. 61/836,937 filed on 19 Jun. 2013 and U.S. Provisional Application Ser. No. 61/879,006 filed on 17 Sep. 2013, which are incorporated in their entirety by this reference.

TECHNICAL FIELD

This invention relates generally to the multimedia messaging field, and more specifically to a new and useful system and method for transmitting media messages in the multimedia messaging field.

BACKGROUND

Multimedia messaging, or more specifically MMS messaging, is a common medium for communicating between users. Various systems and applications can make use of MMS messaging for transmitting rich media to users. However, sending a MMS message programmatically through a telecommunications platform or other system interfacing with the MMS network can complicate the development, as it requires the generation of phone specific media graphics. As the variety of computing devices expands into various form factors such as phones, tablets, heads mounted displays, watches, and other devices, the range of media content requirements also grows making it challenging for applications to provide appropriate media formats. Thus, there is a need in the multimedia messaging field to create a new and useful system and method for transmitting media messages. This invention provides such a new and useful system and method.

BRIEF DESCRIPTION OF THE FIGURES

FIGS. 5A and 5B are exemplary samples of telephony instruction documents;

FIG. 16 is an exemplary messaging instruction document;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Delivering Media

Figure 1:
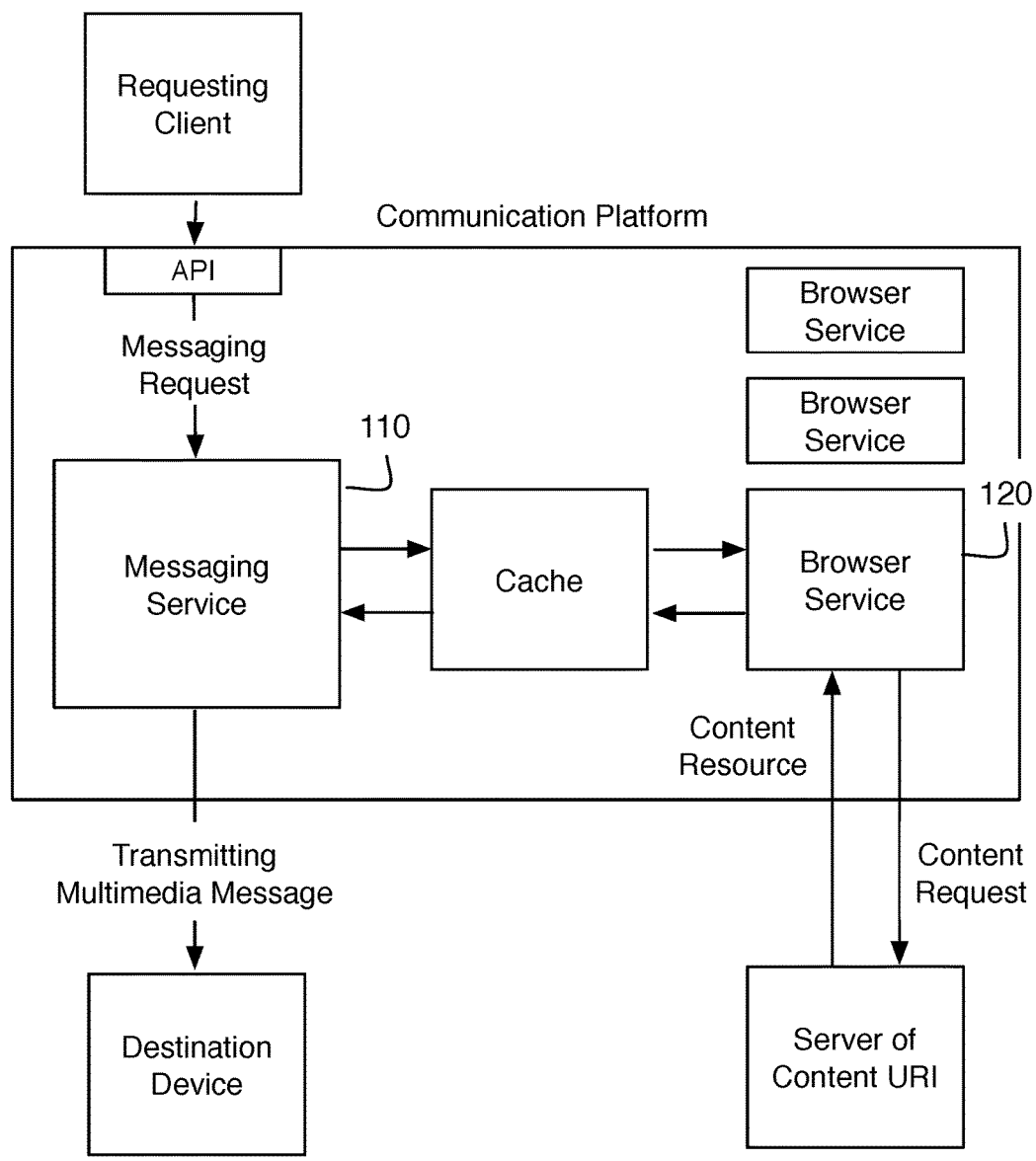
FIG. 1 is a schematic representation of a system of a preferred embodiment.

As shown in FIG. 1, a system for delivering media messages of a preferred embodiment can include a media service 110 configured for using an intermediary browser service 120 for retrieving media and at least one programmatic interface 130. The system functions to enable web and application developers to apply web development skills and graphics in serving graphical media files. The system can optionally include a cache, which functions to improve performance for bulk or repeated delivery of media assets. The system is preferably used as an alternative to media resource retrieval, where media is created from web content rendered through the browser service 120. In a preferred embodiment, the media service 110 is a media messaging service of a communication platform, and the system is used to enable a dynamic media referencing mechanism that preferably simplifies the process of providing a wide range of customized media content. For example, the system can be used to deliver MMS messages or messages over proprietary messaging protocols (e.g., Over-The-Top (OTT) services). In an alternative embodiment, the system can be used as a generic API service for accessing media.

The system preferably functions to enable web development tools to be applied to multimedia messaging. Through use of the system a developer can use HTML, CSS, JavaScript, and other web design skills in formatting and optionally animating the media, while server side technology can enable the content to be dynamically updated without incurring substantial resource overhead in generating media. The system further functions to operate as an abstraction layer that transforms media intent to appropriate media representation. The system enables the delegation of media creation to a browser service that can use an accessible webpage to create media content. In some variations, the system can generate media customized to the viewing devices such as formatting the media for telephony based MMS messages. In an exemplary implementation, the webpage includes assets that previously exist on a webpage, and so the application can use these existing webpage assets to define the media. The system is preferably implemented within the context of a communication platform such as the one described in U.S. Pat. No. 8,306,201, filed 2 Apr. 2009, which is hereby incorporated in its entirety by this reference. The system is preferably integrated with an API and/or a communication application-processing unit of the communication platform that can facilitate in the initiation of media delivery or multimedia message communication. Applications and/or services that use the communication platform for the programmatic delivery of media messages, can use web development tools to specify and control delivered media. While the system can be applied to a general API service, the use of the system within a messaging service is a preferred embodiment described herein, but such descriptions are not meant to limit the application of the system to only messaging applications.

Figure 2:
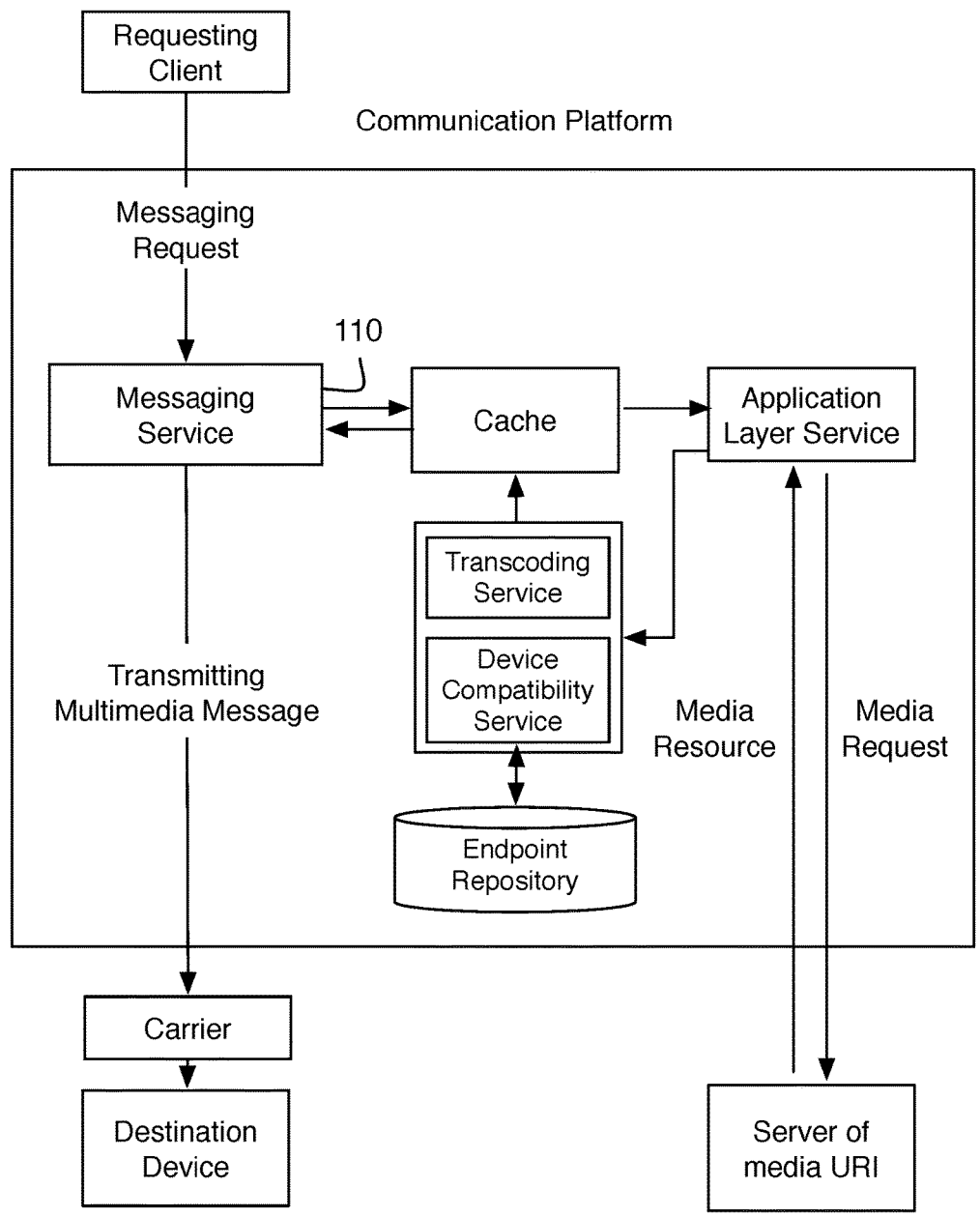
FIGS. 2 and 3 are a schematic representations of a variations of a system of a preferred embodiment.
Figure 3:
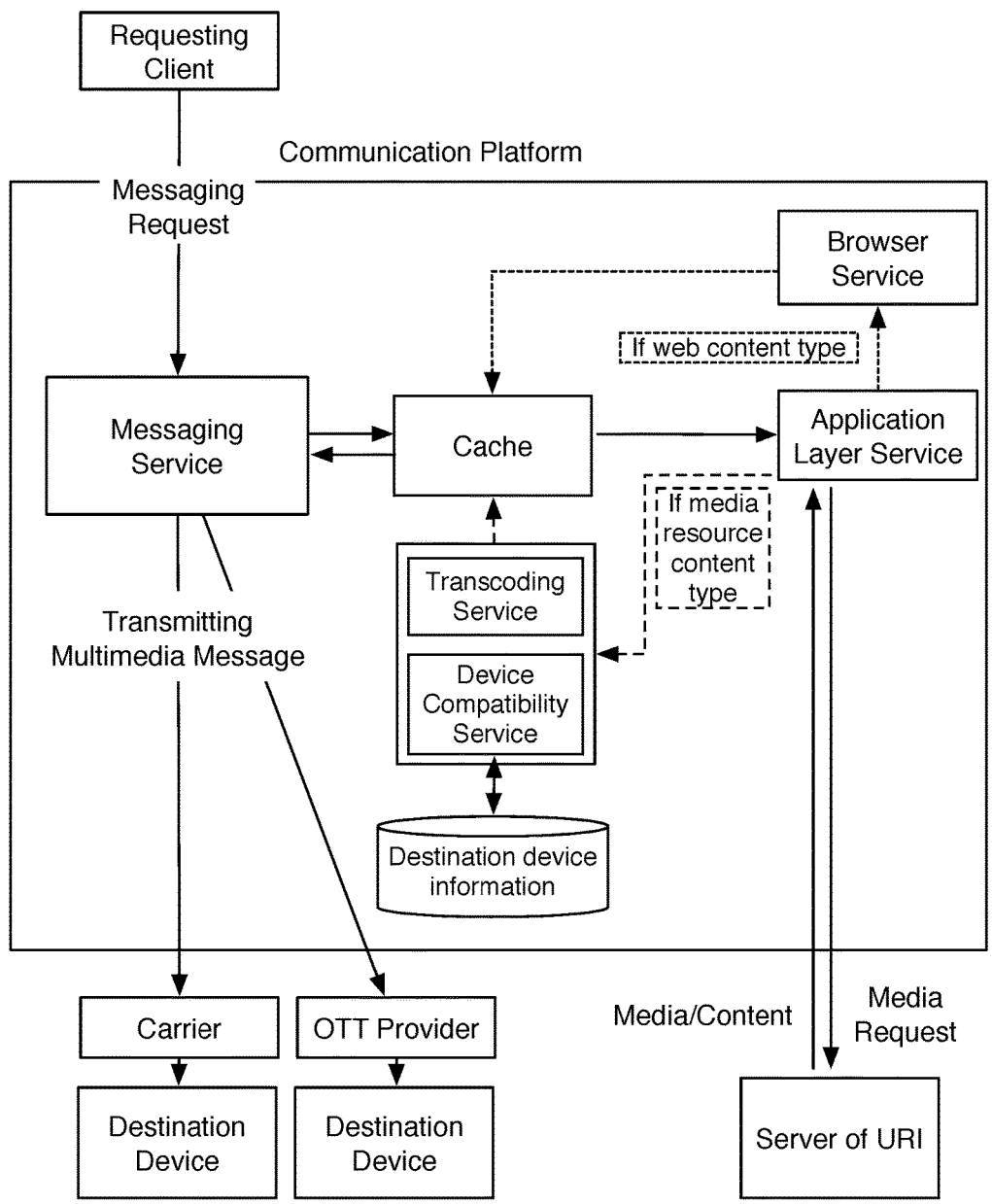

The system can additionally or alternatively include components to facilitate general media serving capabilities. The system preferably allows media messaging requests to specify media through a URI, which can be used to asynchronously retrieve media and deliver the media. As shown in FIG. 2, an application layer service can facilitate retrieval of media content. Transformation service such as transcoding service and a device compatibility service preferably convert a retrieved media file to a format suitable for delivery. As shown in FIG. 3, the browser service and web content rendering approach can be combined with the media retrieval and transformation approach. Preferably, the application layer section accesses the URI, then based on the content type selectively invokes the appropriate media modifying process. Alternatively, the two system variations may be combined so that the browser service and media transformation services are used for both types of content.

The communication platform and more specifically the media service 110 and the browser service 120 of the communication platform are preferably implemented on a cloud hosting environment, a distributed computing system, a server cluster, and/or any suitable network accessible computing infrastructure. The media service 110, the browser service 120, and/or any suitable component may include a scalable set of service instances that may be scaled to meet demand. The media service 110 and more specifically the media messaging service 110 can act as central controller for business logic such as responding to requests and coordinating collection of related web content resource and use of the browser services 120 to render media. The media messaging service 110 is preferably operable on a server and functions to receive messaging requests and initiate transmission of the message to a communication endpoint such as a PSTN phone, a SIP device, a client application operable on a computing device, or any suitable device. An endpoint can refer to phone number, a short code, a SIP address, a user account identifier, or any suitable address of a communication destination. The communication device is preferably capable of MMS or alternatively SMS, a proprietary messaging protocol (e.g., OTT service messaging), and/or any suitable messaging protocol. The message requests preferably specify a content URI. Alternatively, a content URI may be mapped to a messaging request or a content URI may be extracted from the messaging request (e.g., using a URI included in an SMS). In an alternative embodiment, a base web content resource may be supplied as a data object (e.g., the HTML document included in the data field of a request). The messaging service is preferably configured for receiving or triggering a messaging request, making a content request to a browser service (as directed by the messaging request), and upon generating a transmittable media as a result of the browser service, the message is delivered to a destination using the generated media. The messaging service may enable numerous messaging options. As one variation of a messaging option, a messaging request may include media in the messaging request and the browser service is selectively skipped. As another variation, multiple endpoint destinations may be sent, and the media generated by the browser service may be cached or shared for the plurality of transmitted messages.

The browser service 120 of the preferred embodiment functions to generate media using native browser rendering. The browser is preferably a headless browser service, routine, module, or program. The browser service may alternatively be any suitable automated browser that can generate an image of a webpage as would be rendered by some variation of a browser. The browser service preferably renders web content on a simulated, virtual display—the browser service preferably operates without physically rendering the content on a display. The browser rendering preferably substantially conforms to web standards but may additionally use various rendering patterns such as those used in the WebKit and Gecko open source projects. The browser service is preferably configured to access a content URI as directed by a messaging service or other suitable component. A content retrieval system may be used to retrieve web content (e.g., application layer service), but the content retrieval system may alternatively be a tool or service integrated with the browser service 120. The content retrieval preferably uses similar approaches as used in a browser, where a base resource (e.g., HTML page) is retrieved and then any resources referenced in that document are retrieved (e.g., stylesheets, scripts, images, media files, fonts, etc.). During retrieval of content, caches, sessions, client storage, and other suitable features available to standard browsers can be simulated within the context of a session. In the case of cookies and caches, the media requests are preferably made in association with a particular account. And may be made more specifically in association with a particular endpoint of the account or even a particular communication session. Since the browser service 120 is preferably part of a multitenant service, the cookies, caches, and/or other session related content may be scoped to within user contexts such as accounts, endpoints, or defined sessions. A media rendering, preferably virtually (i.e., not displayed), is generated from the media content at the content URI. The media file is then preferably supplied to the media service 110 for delivery. The media file may additionally be cached for subsequent content requests to the content URI. The media cache preferably exists in front of the browser retrieval and rendering functionality such that if a request to render a specific URI is cached then that media can be returned without retrieving any content or rendering. There may be a plurality of browser services that can be load balanced or used in any suitable manner. The plurality of browser services preferably provides scalable capacity to support a multi-tenant communication platform.

Figure 4:
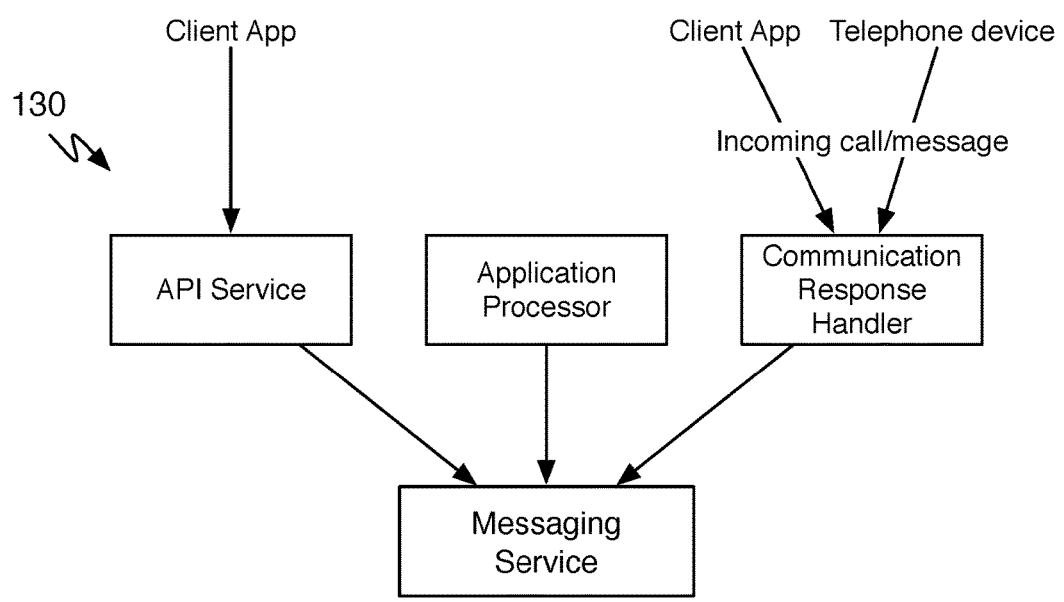
FIG. 4 is a schematic representation of various interfaces.

The system can additionally or alternatively include at least one programmatic interface such as a message API service, a media API service, and/or an inbound message router as shown in FIG. 4.

The message API service functions to enable programmatic interaction with the communication platform and the messaging data or capabilities. The message API can be part of a larger public API of the communication platform. The message API can be used by outside entities (e.g., account holders). API calls can be used to initiate outgoing calls, modify pending messages, respond to messages, inspect account message history, inspect metadata of a delivered message, or any suitable interaction.

Figure 10:
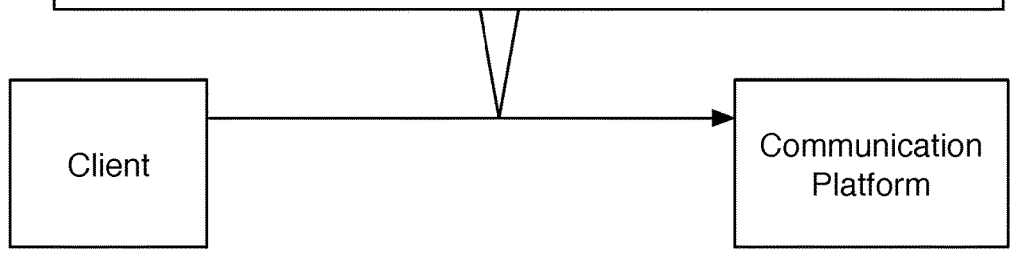
FIG. 10 is an exemplary multimedia message request.

The API is preferably a RESTful API but may alternatively be any suitable API such as SOAP. The API works according to an HTTP request and response model. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. An account preferably has a message resource that an account can write to if an outgoing message is requested. A message request preferably includes a destination endpoint and message content reference. The message request can additionally include an origin endpoint, a callback URI for when a message is successfully sent, a message handler URI used for received responses, and/or any suitable additional properties. The message content reference can include text and media references. The media references are preferably specified as media URIs. Multiple media files can be referenced. The messages can be sent in individual messages or combined in an appropriate manner. As shown in FIG. 10, an account can POST to a message resource URI path with parameters that define a requested media message.

The message API service can additionally include an interface with access to information about sent messages. The message API can include a plurality of different message API resources that are used for defining a model of content of the communication platform. An account can read from a 'messages' resource, which contains a historical list of sent messages. A list of message identifiers can be returned. The message API can additionally provide mechanisms to filter queried messages based on individual message properties such as date, media type, destination, origin, or any suitable property. Individual messages can additionally be queried through API resources identified through a message identifier. A transmitted or attempted message can include a message identifier, which functions to uniquely identify a message. The message identifier can be applied to multiple messages sent in response to a single messaging instruction. Alternatively a message identifier can be a reference to individual messages transmitted from the application platform. The message identifier can additionally be applied to responses and subsequent messages part of the same "conversation". A message conversation can be defined by messages between at least two endpoints. A message conversation can additionally include a time window that defines when messages become a new conversation.

An inbound message router of a preferred embodiment is a service that facilitates handling inbound messages directed at an endpoint managed by the application platform. The message router functions to initiate or receive messages from the messaging device and to connect to a web-application server. The web-application server is preferably mapped to the called/messaged phone number through a response handler. The message router can receive and transmit messages over SMS, MMS, client application IP protocols, or any suitable messaging protocol. The message router can be implemented by multiple services that handle a different protocol. The message router preferably communicates with an external application server of a developer using an application layer protocol, more preferably using the HTTP, a secure HTTPS protocol, SPDY, or any suitable networking application layer protocol. The communication between the application server and the message router is preferably stateless and any state information (e.g., call state) or data is preferably located in a URI or the request parameters, such as HTTP headers, GET URI parameters, POST request body parameters, or HTTP cookies. Available state information is preferably transmitted by message router requests to the application server for stateless processing. The application server can store local state information, such as databases or sessions, as is common in web development. The communication platform can appear as a client device, and simulate caching and cookies and other suitable properties of a browser, but simulating client behavior on behalf of incoming messages. The message router preferably associates message destination endpoint (e.g., the called phone number) with a starting URI. The URI is provided by the application server, and more preferably the URI is provided by the application developer before a message is received at the message router by associating the initial URI with the incoming call address (such as DID, shortcode SIP address, account identifier etc.) or by an outside application upon initiation of an outgoing message (i.e., the message handler URI).

The message router preferably sends message data such as the caller number (obtained via Caller ID), caller geographic data (country, city, and/or state, zip) the number dialed, the time of the message, or any other suitable information or parameter. The message data can be digitally signed with a secret key stored in the communication platform. A cryptographic hash of the information is preferably included along with the information as a digital signature. The message router may also encrypt sensitive information (either before or after the cryptographic hash is computed) using the secret key to allow sensitive information to be sent across the network. In another variation, authentication credentials can be used in an HTTPS request. The message router can alternatively connect the application server using a pre-arranged machine with a static IP address—an application server can whitelist or blacklist IPs to appropriately allow traffic from the static IP address. In another variation, a VPN pipe can be established between the message router and the application server. The message data is preferably sent as an HTTP POST request to the application server. Message data may also be sent in URI (GET) variables, or encapsulated in HTTP headers. The message data can include the parameters of message identifier, account identifier, origin endpoint, destination endpoint, text of a message, a media count, list of media URIs, and media content type. Additional information such as geographic properties, media properties and other suitable aspects can additionally be used. The response by the message router can include telephony instructions that can trigger any suitable communication response. In one variation, a telephony instruction, such as in the telephony document example shown in FIGS. 5A and 5B, can trigger media messaging. In another variation, the response from the application server can implicitly or explicitly indicate that the document should be converted to a media message response.

2. Method for Serving Multimedia Content

Figure 6:
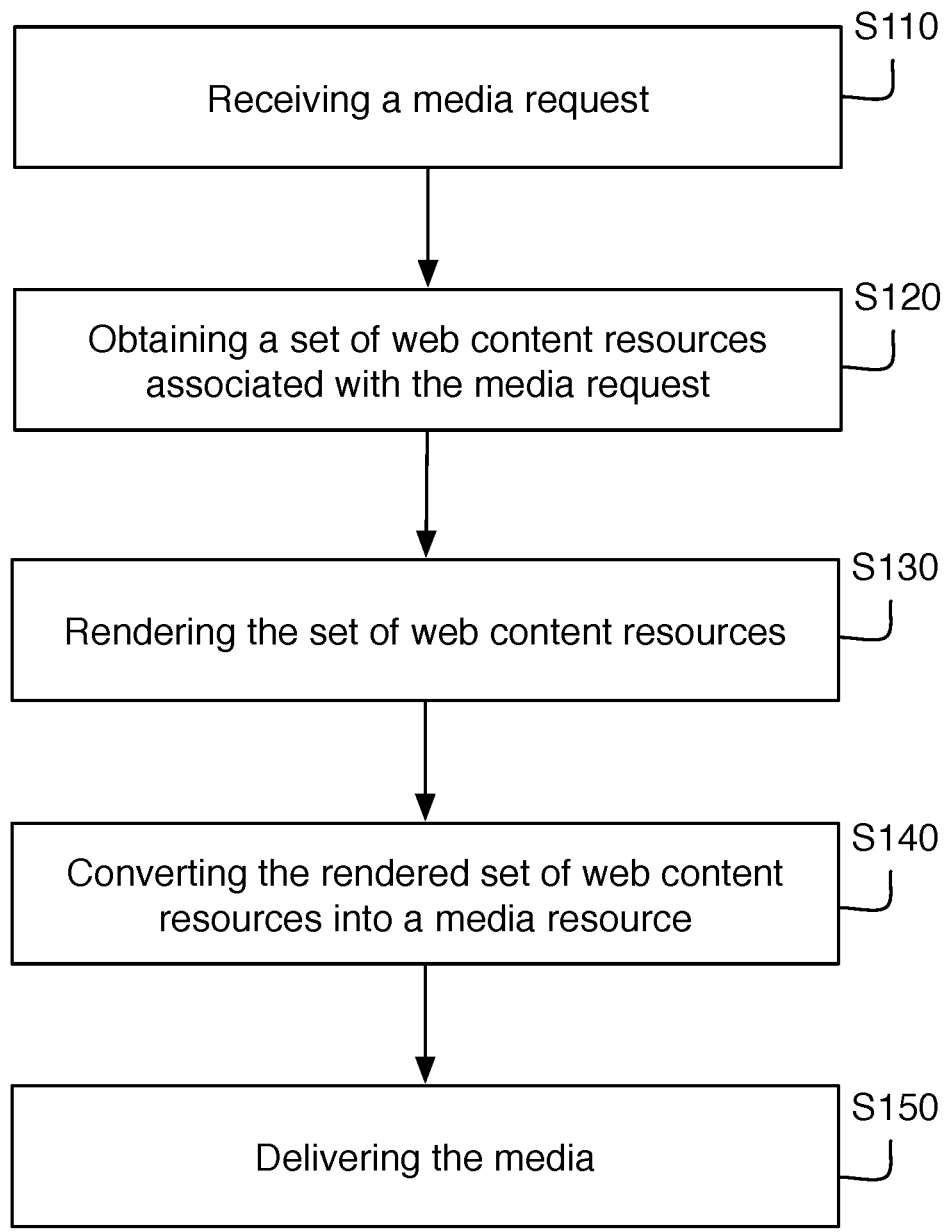
FIG. 6 is a flowchart representation of a method of a preferred embodiment.

As shown in FIG. 6, a method S100 for serving multimedia content of a preferred embodiment can include receiving a media request S110, obtaining a set of web content resources associated with the media request S120, rendering the set of web content resources S130, converting the rendered set of web content resources into a media resource S140, and delivering the media S150. The method functions to provide a mechanism to supply media through web content references. The method preferably employs use of a headless browser service to generate media on behalf of web content. The method can be used to enable media creation to be delegated to a dedicated service that can use rendered web content as the media source. The method can be used to create customized media depending on the requesting device/application. The dimensions, resolution, encoding, format, medium, content, and other properties may be customized based on the context of the request. In one preferred embodiment, the method is used to provide an interface to generation of media. For example, an API may be used to allow applications to request media through a service provider that renders web content into a media format. In one case, a video can be created from an animated webpage. In another case, customized images may be formatted through webpage layout approaches. More specifically, the method is preferably applied to sending multimedia messages. The method can be used to supply a unique mechanism for specifying media of a message. The method can be used in MMS messaging, proprietary IP messaging (e.g., through an OTT service), messaging through a variety of channels (i.e., multi-modal communication. While the below detailed description describes the application of the method for serving multimedia content in the context of media messaging, the method may alternatively be applied to and suitable applications such as the media serving API described above.

Figure 7:
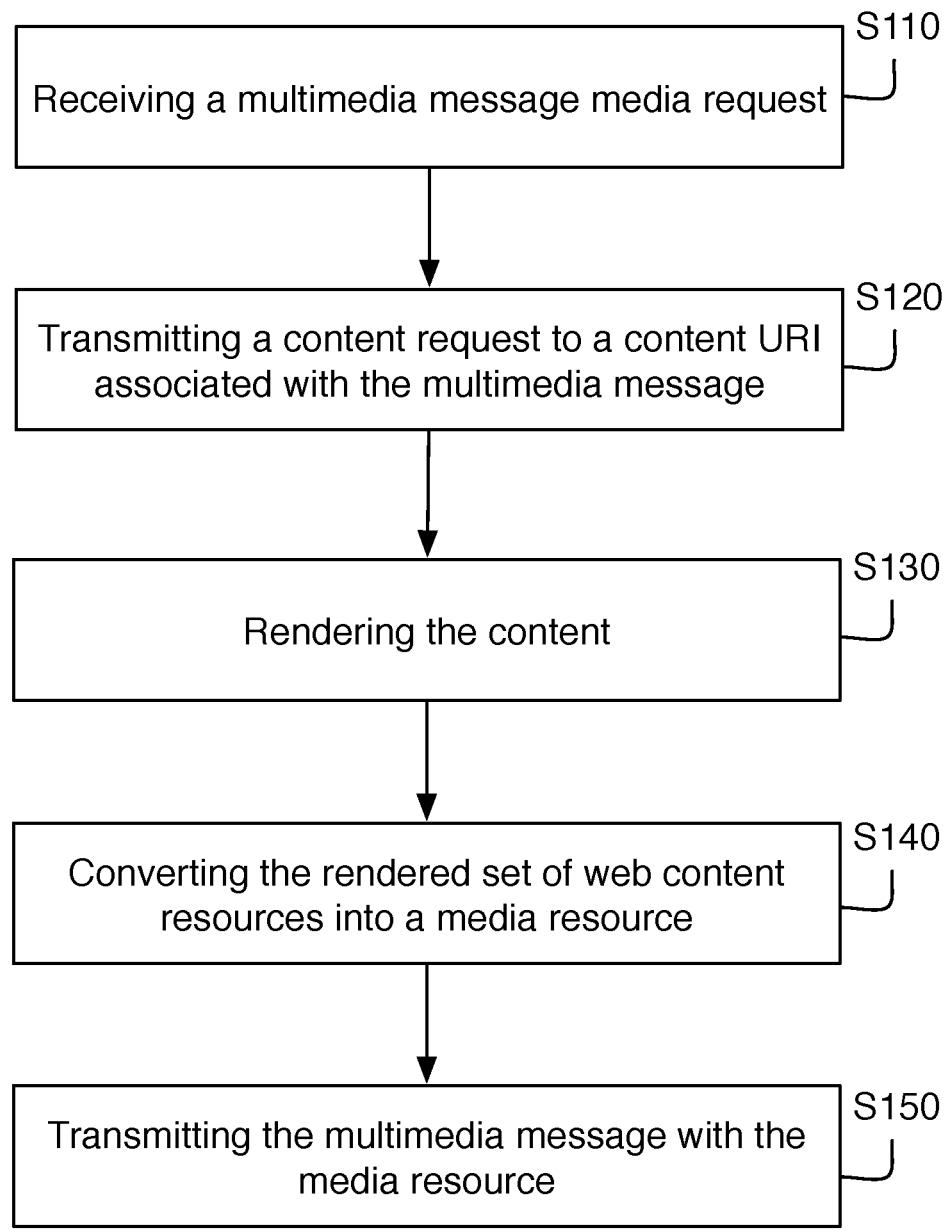
FIG. 7 is a flowchart representation of an implementation of a method of a preferred embodiment.
Figure 8:
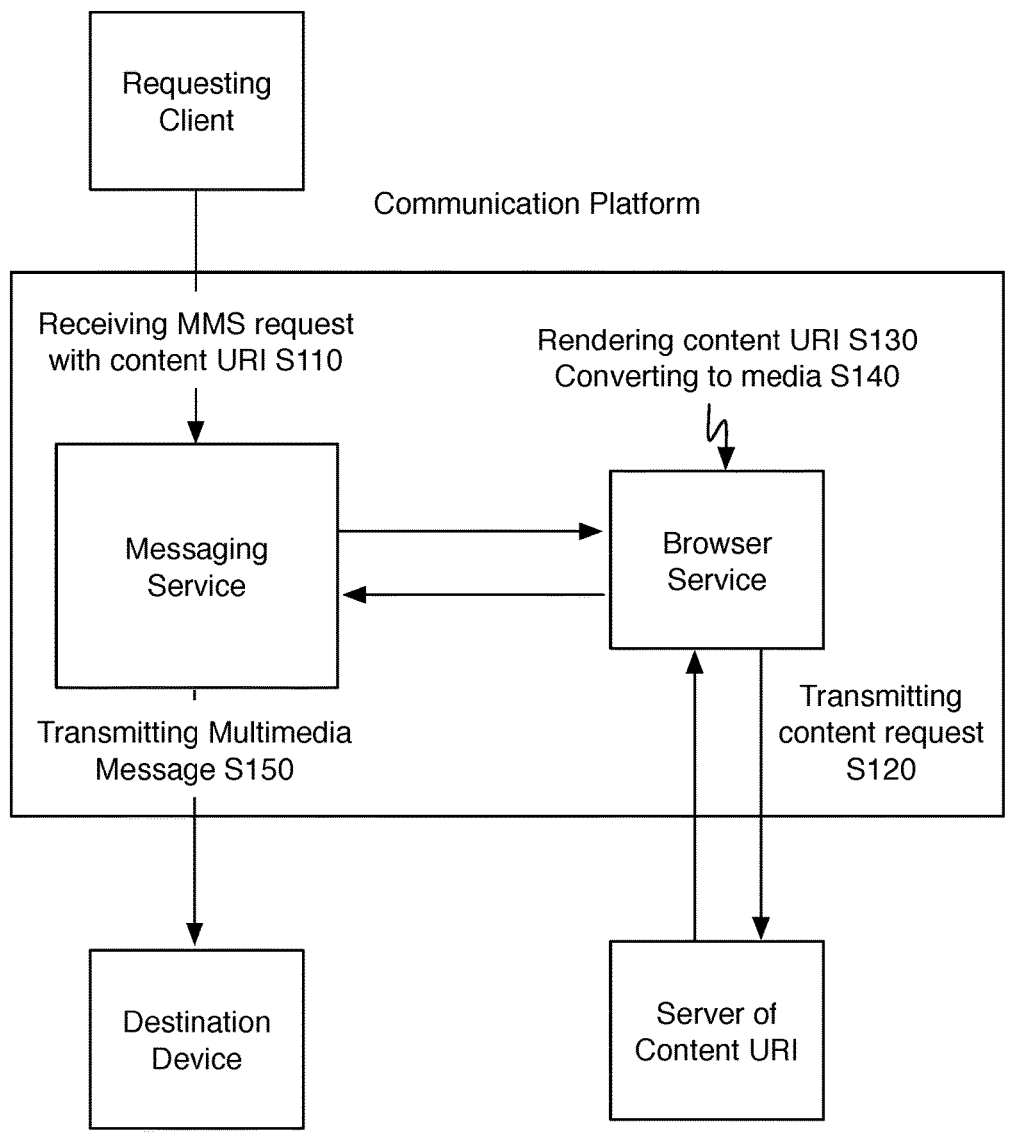
FIG. 8 is a schematic representation of a method of a preferred embodiment.
Figure 9:
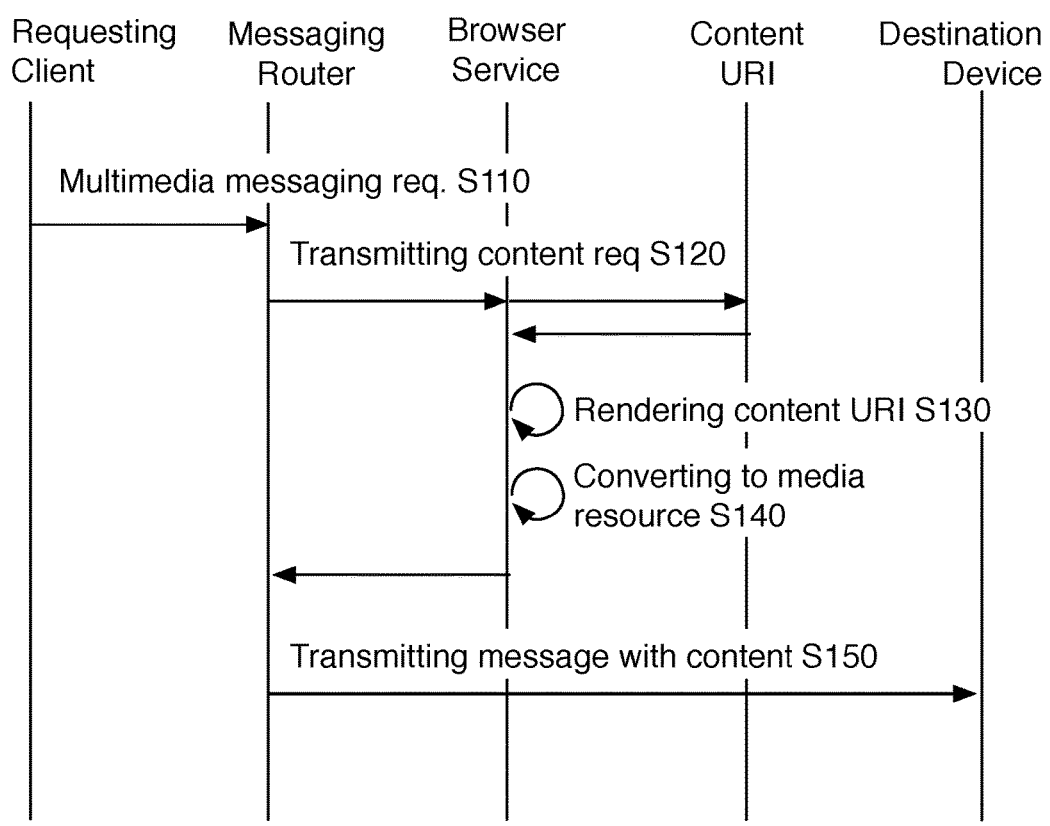
FIG. 9 is a communication flow representation of a method of a preferred embodiment.

As shown in FIGS. 7 and 8, in a messaging application of a preferred embodiment, a method for sending a media message can include receiving a multimedia message request S110, transmitting a content request to a content URI associated with the multimedia message in block S120, rendering the content URI in block S130, converting the rendered content URI into a media resource in block S140, and transmitting the multimedia message with the media resource in block S150. The method functions to adapt the media messaging process for integration with web design and application tools. In particular, the method can facilitate transformation of media to a telephony compatible format (or more generally format compatible with a destination device). The method is preferably implemented in combination with a telecommunications platform that enables programmatic and application controlled interactions with telephony sessions (PSTN, SIP, etc.) and communications (SMS, MMS, client IP-based media messaging, etc.). The telecommunications platform is preferably a multi-tenant platform wherein multiple users can make outgoing multimedia messaging requests. The method preferably enables a developer to repurpose web technologies for delivering content to users in a messaging channel as shown in FIG. 9. In many cases, web applications will have pre-existing functionality for rendering content for users using web technologies. For example, web applications may use HTML, CSS, JavaScript, and the like to render content. Additionally, application logic on the client side or server side may be employed to customize the media. These same views or web pages may be reused to define media delivered to customers. For example, an airline website will often be able to display a digital ticket that may include dynamic content like a flight number, the passenger name, seat assignment, gate number, and possibly a QR or machine readable code for scanning of the ticket. The method preferably enables the digital ticket to be dynamically rendered and transferred to a customer through the method of sending a multimedia message. Similarly, the method may additionally or alternatively enable the web based processing of messages for content delivery. The method can be used in generating static image data, animated images, videos, and/or any suitable media medium.

Step S110, which includes receiving a media request, functions to initiate the delivery of a media. The media request is preferably made within or in association with a media messaging request. The media request can be initiated through a number of different events. Three exemplary forms of requests can include an API request, an event triggered by an application (e.g., application instruction), or an internal event response to an outside event (e.g., triggering a response to an inbound message). The media message request is preferably received in the form of an inbound application programming interface (API) request, and more preferably a REST API request. The API request preferably instructs or specifies directives that result in directing the transmission of a message to a destination, where the message includes at least one media item referenced in the request. The referenced media item is preferably generated through the method. The API request is preferably a received HTTP request to an API resource for multimedia messaging. For example the multimedia messaging request can be a HTTP POST to a messaging resource. The messaging resource can be addressed through a messaging resource URI such as "/Account-ID/Messages" as shown in FIG. 10.

In another variation, receiving a media message request includes processing an application directive instructing the transmission of a message to the destination with at least one reference media item. As described above, the method may be used within a communication application platform that enables communication flow logic to be controlled/specified within application instructions. One or more of those instructions may be used to instruct the retrieval of a media item through blocks S120, S130 and S140 and transmit the media in a multimedia message.

In yet another variation, the communication platform may enable various endpoints of the platform to be configured with response resources. A mapping can be set between incoming communication to a specific endpoint (or a set of endpoints) and the resource used to determine the response. Accordingly, the method can include receiving an inbound communication to an endpoint of the communication platform, where the endpoint of the communication platform is configured with a response resource, and where receiving a media message request includes triggering access of the response configured to the endpoint of the communication platform in response to the inbound communication; The destination of the delivered message is preferably the origin endpoint of the inbound communication. The response resources may specify an application to be retrieved and processed (where an instruction may trigger sending of a media message), a destination endpoint may be specified for the message to be simply rerouted to that destination, or a media content resource can be specified wherein media is generated and automatically used as a response to the incoming message. In one variation, the application may be specified through a URI and the media content response is also specified through a URI. The method preferably retrieves the content from the URI and then determines the type of response (e.g., selecting a first option of executing an application or selecting a second option of creating media and responding). For example, if the response is an XML document then the document is treated as an application instruction document; if the content is HTML the message the web content is rendered and transformed into media through blocks S120, S130, and S140; if the content is plain text, a plain text message response is made.

The multimedia message request may alternatively be initiated within a communication session (e.g., based on a telephony application managing the state of a call), a scheduled request, user initiated within a client application (which preferably uses an API request), or any suitable source of a media message request. In yet another variation, the multimedia messaging request may be any suitable form of request. For example, the request may be a text messaging request. The proceeding steps of the method may be used to convert the message, apply web based pre-processing of the message (e.g., translation, converting to audio or video, link shortening, and the like), or any suitable form of preliminary web rendering of a message.

The multimedia messaging request preferably includes a content URI, a to-field and from-field destination identifiers, optionally one or more control parameters, and/or any suitable parameters. The content URI is preferably used in generating, providing, or processing content for message delivery. Content for message delivery can include text, images, video, audio, documents, application content, and/or any suitable form of content. The content URI is preferably a HTTP or HTTPS based URI but may alternatively specify any suitable transport protocol. The content URI is preferably at least one of the parameters of the messaging request. Alternatively, an account may be pre-configured with a rendering URI or a platform may automatically select a content URI based on the content of the message. In one variation, the communication platform may have generically applied content URIs for image processing, video processing, encoding processing, or any suitable categorization of message. In another variation, the multimedia messaging request may include a plurality of content URIs that may be used in combination in any suitable manner. In one variation, the plurality of content URIs may be directives for combining the media. For example, a URI to an MP3, a plurality of image URIs and message text may be automatically combined and rendered into a video displaying the text with a slideshow of the images and the audio track of the MP3 file. In another variation, the plurality of content URIs may be for batch message delivery. For example, a multimedia messaging request may include a plurality of content URIs that can be sequentially processed and sent to the destination in separate messages, which may alleviate and simplify the process of sending a plurality of media messages to a destination at substantially one time. In yet another variation, the multimedia message request may specify a particular action or directive that is associated with a content URI. The platform can limit media referenced by a content URI to any suitable set of supported media content types. The content type is preferably obtained from the media URI. If the content type is not supported the communication platform can raise an error or respond with any suitable response. Multiple media URIs can be specified in the multimedia request. Additionally, text can be included which can be transmitted as a separate text message. The referenced media files can be sent as separate media messages, but the media files can be automatically combined into a single media file (e.g., image collage, video slideshow of still images, organized into a media presentation (e.g., video slide show), or any suitable combination of multiple media files.

In an alternative or additional variation, in place of a content URI, a web content resource may be supplied as a data object. More specifically a hypertext language data object can be supplied in place of a URI. The provided web content resource data object is preferably treated in a substantially similar manner as the resource retrieved from a URI: linked, embedded, or referenced resources within the web content resource data object can be subsequently obtained when obtaining the full set of web content resources.

The from-field is preferably associated with a telephony endpoint (e.g., phone number, short code, SIP address, username of an OTT service etc.) and/or an account of the telecommunication platform. The from-field can alternatively default to a pre-defined endpoint of the sending account. The destination endpoint address can be a telephony number, a short code, a SIP address, a user identifier of a platform/application, or any suitable reference to a destination device. There can additionally be multiple destination endpoints, which will result in a group message or alternatively individual messages depending on network and protocol support of the destination endpoints. Settings for multimedia messaging may additionally be configured specifically for a particular account, sub-account, endpoint, or any suitable entity designation. The message directive may include a message type parameter (or other suitable parameter) that can include directives like encode, translate, slideshow, or other suitable directive. The directives are preferably associated with internal or external content URIs that process or provide service based on the content of the message. As an exemplary application of an encode directive, a message may delivered to a content URI that renders the original content using a specific encoding capability, so that an image representation of the message can be created and sent as an image of the message with proper encoding. The encoding variation may be used for messaging between devices/carriers that have incompatible encoding capabilities for messages. Directives may additionally be supplied in the response of an application server responding to the content request in block S120. A multimedia request can additionally include a message handler URI, which functions to define a URI used to handle responses to an outgoing message. The handler URI is preferably mapped to incoming calls originating from the destination of the multimedia request. An incoming message URI is preferably pre-configured as a default mapping for incoming messages unless a message handler URI is set based on the origin of the message (e.g., the incoming message is from the destination of the first multimedia message and the destination is the origin of the first multimedia message). A conversation time window can define how long the mapping of the message handler URI stays in effect for incoming messages from the destination of the multimedia request.

Alternatively, a messaging service may process the content of a message request and automatically initiate the proceeding steps to automatically transform the message to a media message. Processing the message request preferably includes analyzing the content of a message for at least one content pattern. A content pattern may be looking for particular terms (e.g., product or business names), tags (e.g., hash tags), or URIs. In an alternative variation, a content URI may be automatically selected for use with a messaging request. One preferred implementation will detect a URI within the body of the message content. The URI in the body of the message may be for an image, a video, a webpage, or any suitable resource. In the variation where the content pattern is based on a URI pattern, the content URI is preferably automatically selected or derived from the URI of the message body. The automatic selection of a content URI is preferably for particular types of messages, particular content patterns, or for types of requests. If a text message includes a URI that appears to be a link to an image or an online website photo page (e.g., a photo sharing gallery or coupon) then that URI or some other media specific URI that includes the original URI as a parameter is preferably used as the content URI. In another variation, a content URI may be registered by the account holder or from an outside entity to automatically trigger sending a media resource when particular terms, patterns, or content are identified in the message request. For example, a restaurant review site may enable the automatic sending of a media message with a restaurant review media when a sent text message mentions the name of a reviewed restaurant. A preconfigured content URI can preferably provide dynamic media content, because context of the particular communication is preferably passed along when obtaining the content and the application server of the developer can serve the appropriate webpage to generate the media.

The multimedia messaging request may additionally include control parameters that dictate, influence, or alter the generation of media for the message request. The control parameters may specify media dimensions, media format, where to extract the media from the URI, data parameters to pass to the URI (e.g., as POST or GET parameters), authentication parameters, and/or any suitable control parameters. In one variation, the control parameters preferably define the height and width of the browser window in step S130. Additionally or alternatively, control parameters may be specified in the web content obtained or retrieved in block S120.

Step S120, which includes obtaining a set of web content resources associated with the media message request, functions to access, view, or visit a network resource that has been delegated the task of content processing and display. Obtaining a set of web content resources can include transmitting a content request to the content UR. The content request is preferably made over an application layer protocol such as HTTP or SPDY. Obtaining a set of web content resource may alternatively be made in response to a base web content document such as an HTML data object. In either case, multiple application layer protocol request response sequences are preferably executed to retrieve the referenced, embedded, or otherwise included resources such as stylesheets, JavaScript files, applets, flash files, images, video, audio, fonts, and/or other suitable components as would be obtained when rendering a webpage. Transmitting a content request preferably includes transmitting an HTTP content request to the content URI. The multimedia message request may specify the HTTP message request type such as GET or POST, but the method may default to or use any suitable request type. Preferably, a request is passed to a browser service that manages the communication of the HTTP request. As described below, the request may initially pass through a media cache prior to a browser service making the content request to the content URI. Parameters of the multimedia message request are preferably passed as data parameters of the request. The originating endpoint, the destination endpoint, properties of the destination endpoint (e.g., device capabilities), and/or other parameters of the multimedia message request can be included as parameters of the HTTP request. The parameters of the request are preferably subsequently used by the URI resource (e.g., an application server of a user/developer) to display the appropriate dynamic content. An authentication token or other unique identifier either in a data parameter or embedded in the path of the URI may be used by an outside application to dynamically select content for a particular user. Alternatively, the authentication token may be used to validate that the request is originating from the communication token. For example, an application may generate a unique URI that expires after a particular amount of time and/or that is limited to access by the communication platform—after the communication platform securely accesses the content, the URI may expire. Metadata or informational data are preferably included in the request. The metadata can include communication session/instance information (e.g., caller, session identifier, calling country, the called endpoint, etc.), device information, and/or other suitable information. Communication instance information parameters can be used leveraged by the applications server to provide web content specialized for that particular communication. A data parameter characterizing the destination device can be used by an application server to dynamically adjust the layout to accommodate the restrictions of a device. For example, some devices may have different screen resolutions and/or dimensions. From the parameters of the HTTP request, the application may be able to distinguish the HTTP request as being for a multimedia messaging content. The application can dynamically change templates, use different CSS or formatting, or otherwise create customized content for the multimedia messaging content. The outside application may use the data parameters for any suitable application.

The set of web content preferably includes documents and media resources as can be found on a webpage. The set of web content can include HTML documents, XML documents, images, videos, audio files, scripts, fonts, executable content, and/or any suitable content renderable in a browser. The obtaining of the set of web content additionally supports web caching of resources, cookies, local storage, and other features available to browsers. Since the rendering of content is performed by a headless browser service within a multitenant infrastructure, browsing sessions are preferably scoped to an account, an endpoint, a communication session/conversation (e.g., a set of messages communicated within a conversation timewindow), user defined property (e.g., an optional parameter in the media request species session identifiers) and/or any suitable context. While the same headless browser may be shared between accounts for different communication conversations, the resources can simulate cookies, resource caches, and local storage on a per conversation per account basis.

Step S130, which includes rendering the set of web content resources, functions to generate a view of the content with a browser interpretation. Rendering the set of web content resources preferably includes rendering the content URI, which preferably occurs in a manner substantially similar to the browser rendering of a webpage, and is preferably consistent with the browser interpretation of content that developers are familiar with. A file is preferably received from the specified URI or alternatively the file is provided as a data object in the media request. The file is preferably a markup file such as HTML, XHTML, or any suitable markup file. The file may alternatively be a media file such as an image, audio, video, or an interactive media such as flash or java applet. The file is preferably processed in a browser layout engine (i.e., browser rendering engine) that transforms markup file, formatting information (CSS, XSL, etc.), and/or media resources (images, fonts, video, audio, canvas graphics, executable files) into a view of a document. Rendering of the content URI may additionally include the execution of JavaScript, flash, Java, and/or other browser/client side code during the initialization of the content. In one variation, one of the data parameters may specify directives of the time to wait to allow time for JavaScript to finish initialization or actions to take in the resulting content.

Rendering the content URI preferably includes simulating or controlling a browser. In one preferred implementation, transmitting a content request to the content URI and rendering the content URI is preferably implemented within the context of a headless browser. A headless browser is preferably a software implementation of a browser that lacks browser graphical user interface chrome. The view of the browser is preferably internalized and used to generate, simulate, or otherwise create a data representation of images representing browser views. The headless browser is preferably a service, library, tool, script or other programmatically accessible module. The headless browser may be used to simulate browser actions and any rendering capabilities of a browser. The communication platform preferably includes a plurality of headless browser services that operate on a server or a plurality of servers. The headless browser services are preferably configured to access a requested content URI and return media according to the request. Blocks S120 and S130 are preferably executed by or in cooperation with a headless browser. The headless browser additionally simulates browser session scoped according to the communication. As discussed above, browser session context resources such as cookies, local storage, and media caches can be maintained for scoped browser sessions. The browser sessions can be scoped by account, by endpoint, by endpoint origin to destination pair, by "conversation", by specified session identifier (e.g., specified in the media request), or based on any suitable scope. Alternatively, a browser with a graphical user interface or any suitable programmatic browser may be used in rendering the media. Since the rendering preferably uses standard browser rendering, the browser module may render markup files (e.g., HTML, XHTML, etc.), media files (e.g., jpg, gifs, svg, pdf, mpeg, mp3, wma, etc.), layout files (e.g., CSS), executable code (e.g., JavaScript, flash, java applets, etc.), raw text, and/or any suitable content that can be rendered in a browser.

Rendering the content URI may additionally include applying a transformation to the webpage content, which functions to convert resources that meet basic patterns in content such as video streaming sites, blogs, social media sites, and other common content patterns. In one variation transforming the webpage content may include applying a custom CSS, which preferably optimizes the content for MMS media. For example, a simplifying CSS stylesheet may be applied to the document to normalize the content. In one variation, a normalizing stylesheet may be enforced through the communication platform, but a normalizing stylesheet may alternatively be set per account, per endpoint, per communication, or according to any suitable scope.

Applying Transformation

Figure 11:
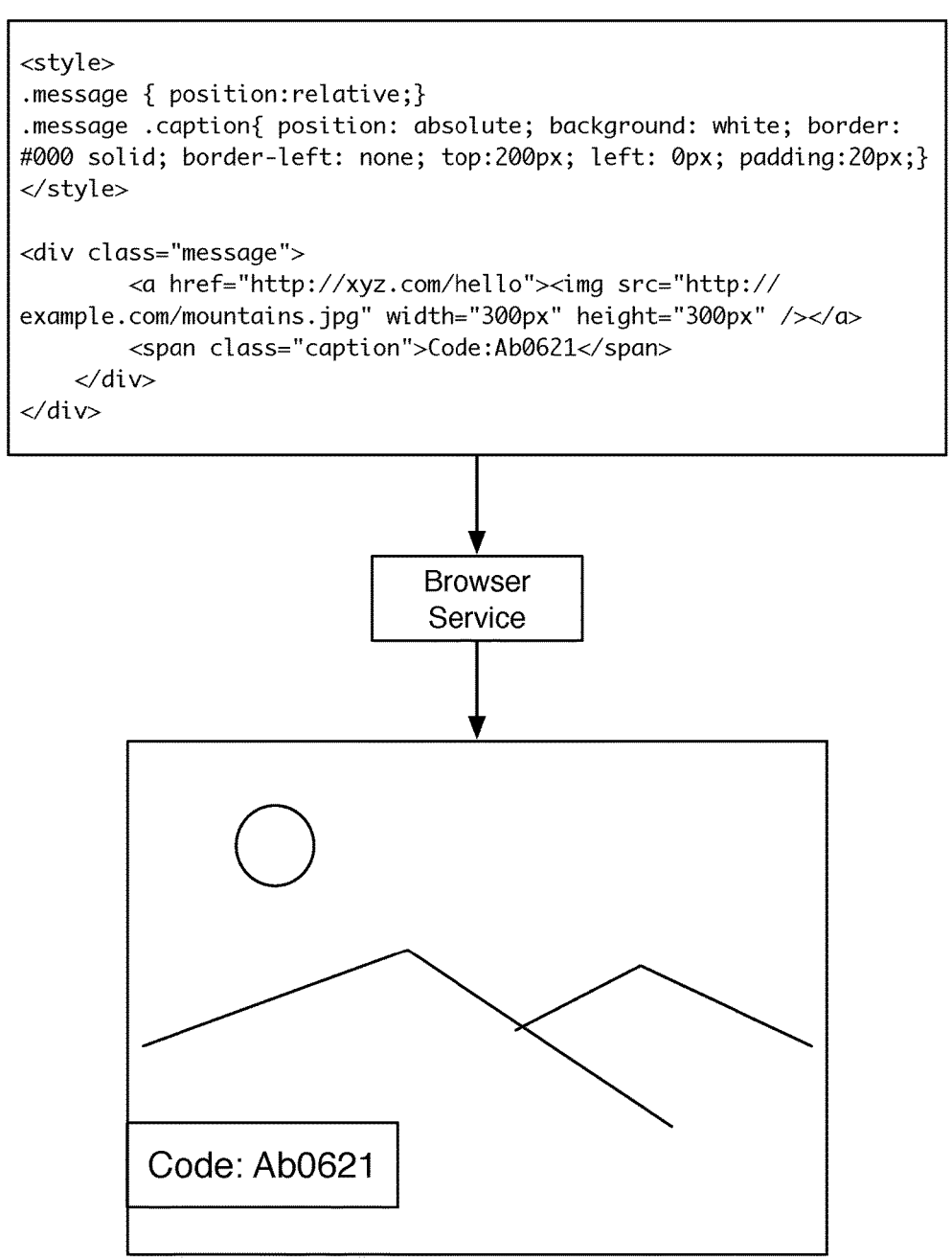
FIG. 11 is a schematic representation of a browser service rendering and converting to a media resource.

Step S140, which includes converting the rendered set of web content resources into a media resource, functions to use a view or media from a browser rendering as the delivered message. Converting the rendered set of web content resources preferably includes taking a screenshot, capturing a sequence of images, capturing video, or otherwise converting the rendered content URI to a media representation of the content. Web design skills could be applied to formatting a dynamic media item as shown in FIG. 11. The screenshot is preferably taken of the visible frame of the browser (headless or otherwise). The screenshot may alternatively include all content on a single page, accounting for scrolling within a frame. In one variation, control parameters may have been specified in the multimedia messaging request. Additionally or alternatively, control parameters may be included in the media content obtained in block S120. For example, a specialized header may be set to indicate the format for the media resource and/or how the content should be rendered. The control parameters may define the dimensions of the screenshot, the resolution of the screenshot, scaling of screenshot (e.g., sizing horizontally and vertically to fit in dimensions, including overflow (e.g., including content access through scrolling), or any suitable aspect of the media conversion process. The control parameters may additionally be used to specify a browsing version (e.g., use WebKit, Trident, or Gecko browsing engine). The control parameters can additionally be used to specify file formats or medium. In one variation, the rendered content may be converted into a video or other suitable media representation. The control parameters may specify conversion timing configuration that defines when and how video is generated from the web content. For example, the start and stop recording time and a frame rate may be specified. In messaging, the media content may be specialized for a particular person, a developer can use well understood web animation techniques to create such a customized video. Audio and video images can be captured and combined to form a video resource. Alternatively, a gif or animated image may be generated. Additionally, the content can be converted into a video if video content is detected. A screen capture (i.e., video of the browser view) may be taken of the view including static content on the page and the video. The static content can be used by the application to provide chrome, watermarking, and substantially static content to a video. Alternatively, the video may be extracted from the page. Various heuristics may be used to determine a main video on a page to avoid converting advertisements. The resulting video may be compressed, resized, changed frame rate, changed resolution/size, or be configured for any suitable properties. The properties may be determined by the control parameters, destination device properties, or default settings.

Additionally, converting the rendered content may include caching media resources of content URIs, which functions to improve the performance of the communication platform with regards to creating content for multimedia messaging. A cached media resource may be reused for a content URI if the media resource exists in the cache and optionally hasn't expired according to caching directives. The media cache is preferably an intermediary component between the messaging module and a browser service used to render and generate the media. The media resource cache preferably operates in addition to or in place of a simulated browser cache. The caching of media resources can preferably alleviate the need to reproduce duplicate media resources when bulk messages are sent out. For example, an application may want to send the same MMS message to a plurality of devices. The first MMS message preferably results in the generation of the media resource. The media resource is preferably subsequently cached, and following MMS messages that specify the same content URI will use the cached media resource. The media cache can additionally be used to support API access and to server media content through the API resources. In one implementation, the media transmitted from the messaging platform are exposed for distribution through the URI. For example, an application developer may wish to share a transmitted image in a browser, and a publicly accessible URI of the message API resource can enable such sharing.

Step S150, which includes delivering the media, functions to provide, transmit, or otherwise output media content derived from the webcontent. Preferably delivering media includes transmitting a media message of the media resource. The transmitted multimedia message preferably uses the media resource converted/generated in Step S140. In one variation, the message may be split into at least two messages. One message may include the multimedia content and a second message may include accompanying text. In another variation, a set of media resources may be generated from one or more content URIs of a message request. The multimedia message is preferably transmitted in a manner substantially similar to the transmission of a MMS message. The multimedia message content is formatted into specified MIME format and forwarded to a multimedia message service center (MMSC). The multimedia message then is transported through the MMS network to the destination device. The multimedia message may alternatively be delivered using SIP, a client messaging protocol (e.g., an OTT service provider), or any suitable messaging protocol or protocols. The actual messaging protocol used may depend on the media messaging request, the destination device, and/or the media content. Transmission of multimedia message can be queued to enable rate limiting of outbound messages. The messages are preferably rate limited according to originating endpoints, but can alternatively be rate limited according to any suitable property. The queuing pending multimedia messages can enable accounts to asynchronously make unlimited requests, while the communication platform manages messaging rate limitations imposed by the messaging network. Rate limiting can occur on SMS and MMS networks. Alternative messaging channels can be used when appropriate. In another variation, delivering the media content can include transmitting an API response including the media. The media content is preferably delivered in response to an API request. The media data object may be delivered, but alternatively a URI to a hosted rendered media item may be returned. The use of a URI allows the media content to be delivered indirectly. An application using the media API will preferably use the URI in another context to access the media content. For example, the media API may be used server-side, but the actual media file will be eventually used on a client device, in which case the URI is delivered to the client to retrieve. The URI may be delivered once the media content is created, but may alternatively be delivered before the final media is created (but with the expectation that the URI will eventually reference the final media).

The method may additionally include triggering a callback during multimedia messaging. The callback is a secondary URI that is delegated operation and/or notified of an event during the processing of an outgoing multimedia message. The callback is preferably characterized in the form of a callback URI. The callback URI is preferably for an outside application URI but could alternatively be for an internal resource or any suitable resource. An HTTP message is preferably sent to the callback URI when the associated event is detected. The callback URI is preferably pre-registered or configured for an account or endpoint (i.e., the account or endpoint associated with requesting the outgoing message). Callbacks may be defined for receiving a multimedia messaging request, for rendering a multimedia messaging request, error in generating a media resource, use of the cache, cleaning up the cache, acknowledging the transmission of a message, acknowledging the receipt of the message, or any suitable event within the multimedia messaging process.

Additionally the method can include converting transmitted messages into messaging API resources, which can function to provide status information and historical record of delivered messages. Additionally, the transmitted media can be hosted and exposed for public use of the media in other contexts.

3. Method for Serving Media Messages

Figure 12:
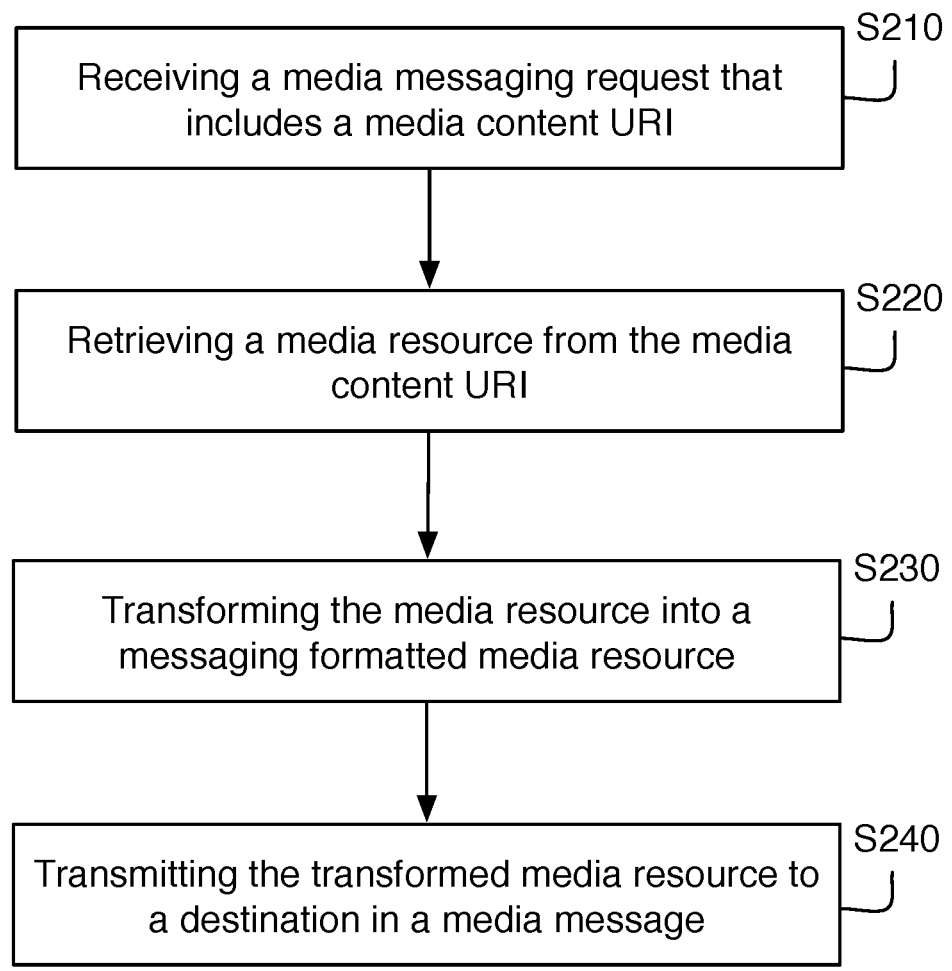
FIG. 12 is a flowchart representation of a method for serving media messages of a preferred embodiment.
Figure 13:
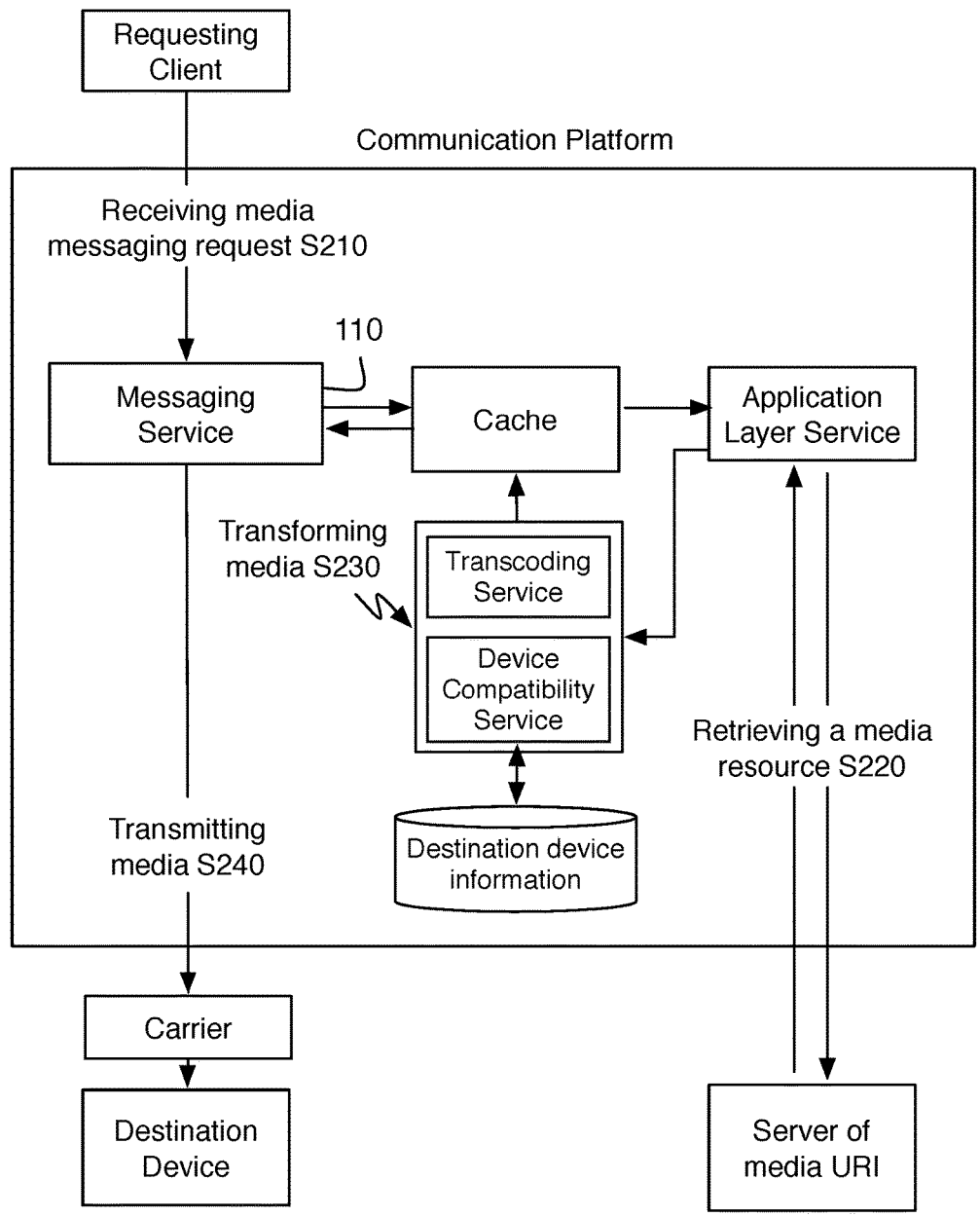
FIG. 13 is a schematic representation of a method of a preferred embodiment.

As shown in FIGS. 12 and 13, a method S200 for serving media messages of a second preferred embodiment can include receiving a media messaging request that includes a media content URI S210, retrieving a media resource from the media content URI S220, transforming the media resource into a messaging formatted media resource S230, and transmitting the transformed media resource to a destination in a media message S240. The method functions to provide a simple mechanism to supply media for delivering in a media message. The method can be used to enable media creation to be performed asynchronously to the requesting of sending a media message. The method S200 can be used in combination or independently with the method S100 described above. In a preferred implementation, method S100 is primarily used when the media content URI results in web content that depends on browser rendering (e.g., is web page), and method S200 is enabled when the media content URI results in a response that is a single media resource. The methods S100 and S200 may additionally be used in combination to dynamically service media requests. For example, the method can include detecting the content type of the media as web content document; and when the media resource is a web content document, obtaining a set of web content resources associated with the web content document, rendering the set of web content resources, and converting the rendered set of web content resources into a formatted media resource; and when the document is a supported media file type (e.g., an image, video, or audio file) transforming the media resource (e.g., transcoding and formatting for a destination device) as shown in FIG. 3.

A single media resource preferably does not include references to other web content such as an image, a video, an audio file, or any suitable media resource. Various aspects of method S100 may additionally be applied in method S200 and on the contrary variations and elements of S00 can be used in S100. For example, the various context parameters can be transmitted to an external application server addressed by the media content URI so that the external application server can return a media resource with customized content dimensions, resolution, encoding, format, medium, content, and other properties. Additionally the method S200 (as in method S100) can be used in dynamically converting media resources to a compatible media format based on the communication protocol and/or the destination device. Further, the use of caching can make bulk media messaging more efficient in use of bandwidth. The method can be used to supply a unique mechanism for specifying media of a message. The method can be used in MMS messaging, proprietary IP messaging (e.g., through an OTT service), messaging through a variety of channels (i.e., multi-modal communication).

Figure 14:
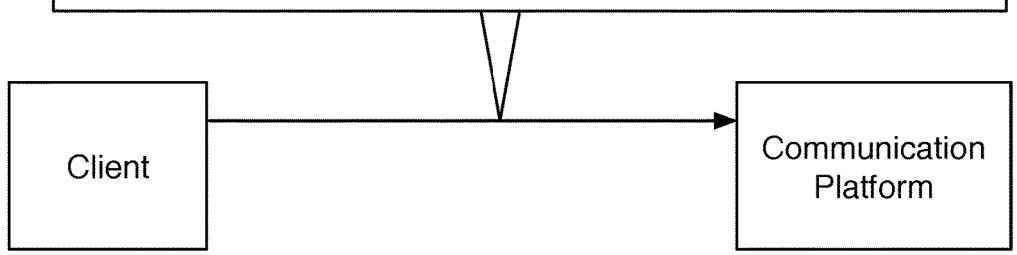
FIG. 14 is an exemplary multimedia message request.

Step S210, which includes receiving a media request that includes a media content URI, functions to initiate the delivery of a media message. The media request is preferably made within or in association with an explicit media messaging request. The media request may alternatively be part of an event that results in media retrieval and upon receiving media resource determining that the media is meant for transmitting in a message. As in method S100, the media request can be initiated through a number of different events. Three exemplary forms of requests can include an API request, an event triggered by an application (e.g., application instruction), or an internal event response to an outside event (e.g., triggering a response to an inbound message). The media message request is preferably received in the form of an inbound application programming interface (API) request, and more preferably a REST API request. The API request preferably instructs or specifies directives that result in directing the transmission of a message to a destination, where the message includes at least one media item referenced in the request. The referenced media item is preferably generated through the method. The API request is preferably a received HTTP request to an API resource for multimedia messaging. For example the multimedia messaging request can be a HTTP POST to a messaging resource. The messaging resource can be addressed through a messaging resource URI such as "/10/Messages" as shown in FIG. 14.

In another variation, receiving a media message request includes processing an application directive instructing the transmission of a message to the destination with at least one reference media item. As described above, the method may be used within a communication application platform that enables communication flow logic to be controlled/specified within application instructions. One or more of those instructions may be used to instruct the retrieval of a media item through blocks S220 and S230 and transmit the media in a multimedia message. In yet another variation, the communication platform may enable various endpoints of the platform to be configured with response resources. Which functions substantially similar to the variation described above. In this example, an endpoint managed by the communication platform can be configured with a resource URI of http://example.com/helloworld.jpg. In this example, a call coming in will result in the fetching an automatic response with the helloworld.jpg resource. The multimedia message request may alternatively be initiated within a communication session (e.g., based on a telephony application managing the state of a call), a scheduled request, user initiated within a client application (which preferably uses an API request), or any suitable source of a media message request. In yet another variation, the multimedia messaging request may be any suitable form of request.

The multimedia messaging request preferably includes a content URI, a to-field and from-field destination identifiers, optionally one or more control parameters, and/or any suitable parameters. The content URI is preferably a web address to an external server hosting a media resource such as an image, video, or other suitable content. In another variation, the multimedia messaging request may include a plurality of content URIs that may be used in combination in any suitable manner. In another variation, the plurality of content URIs may be for batch message delivery. For example, a multimedia messaging request may include a plurality of content URIs that can be sequentially processed and sent to the destination in separate messages, which may alleviate and simplify the process of sending a plurality of media messages to a destination at substantially one time. Similarly, multiple endpoint destinations may be specified to which the same referenced media resource can be sent. As described above, a messaging service may process the content of a message request and automatically initiate the proceeding steps to automatically transform the message to a media message or alternatively supplement a message with a media message.

Step S220, which includes retrieving a media resource from the media content URI, functions to request, access and obtain a media file from a an external server referenced by the media content URI. Retrieving a media resource can include transmitting a content request to the media content URI. The content request is preferably made over an application layer protocol such as HTTP, HTTPS, or SPDY. As such, transmitting a content request preferably includes transmitting an HTTP content request to the content URI. As described below, the request may initially pass through a media cache prior to a browser service making the content request to the content URI. Context parameters of the multimedia message request are preferably passed as data parameters of the request. The originating endpoint, the destination endpoint, properties of the destination endpoint (e.g., device capabilities), session identifier, calling country, the called endpoint, device information, and/or other parameters of the multimedia message request can be included as parameters of the HTTP request. The parameters of the request are preferably subsequently used by the URI resource (e.g., an application server of a user/developer) to display the appropriate dynamic content. For example, a developer could configure a server to instead of simply serving one media resource to any request to selectively server media or even dynamically generate based on the context parameters. The application layer communication from the communication platform to the application servers can be secured. HTTPS and SSL may be used. Additionally or alternatively, can use an auth token and cryptographically sign outbound requests. For example, before making an outgoing request the data parameters and optionally the URI can be bundled into a string and sign using HMAC-SHA1 and the account AuthToken associated with the request as the key. This signature can be included in a custom header field (e.g., x-signature). On the developer's side, an application server can process a request by repeating the process by signing a formed string from the data parameters and URI and cryptographically signing with the accounts auth token. If the generated signature matches the included signature of the request, the request can be authenticated.

Step S230, which includes transforming the media resource into a messaging formatted media resource, functions to apply media transcoding and processing to format the media for message delivery. The messaging protocol in which the message is to be delivered may have a limited number of supported media content types. Transforming the media resource preferably includes transcoding (at a transcoding server) from an original format into a communication compatible format. The compatible format can be a telephony compatible format suitable for MMS messaging, but the compatible format may alternatively be any suitable communication compatible format such as a media format supported by an OTT service. In some variations, transcoding may include translating media from one format to another format. For example, a video may be reduced to a single image (e.g., the first frame, selected frame, collage of multiple frames, etc.). Additional transformation may additionally be applied such as cropping, resizing, changing colorspace of graphics, changing bitrate of audio, changing frame rate, reducing 3D information to 2D, rotating, or any suitable media transformation. The media transformation processing can be performed automatically through standard processing (e.g., all images should have a one by one in height to width ratio).

The method may additionally include querying device information of the destination endpoint and converting the media resource into a device compatible format according to the destination device information. In one variation, the media is converted to a device compatible format after transcoding the media. In another variation, transcoding and conversion to a device compatible format based on the destination can be part of the same or integrated operations. The end physical device may additionally impact the handling of media beyond the limits placed on the communication protocol. For example, some handsets may have limited data capabilities, may be in remote locations where large media resources shouldn't be sent, the devices may be able to handle lower or higher resolution media, may not be able to play particular types of media, or have any suitable limitation.

Querying device information preferably includes accessing an endpoint repository. The endpoint repository preferably aggregates information about different endpoints such as type and model of device associated with the endpoint. For example, the type of phone, the carrier and type of plan, and/or the version of applications on the device. Other contextual information such as usage, location, presence, and other contextual properties may be updated and logged in the repository. The amount of information may vary between endpoints depending on availability and past collection of the device information for the endpoint. The destination endpoint information may be formed in a manner substantially similar to the generation process described below.

Additionally, the method may include caching transformed media resources of content URIs, which functions to improve the performance of the communication platform with regards to creating content for multimedia messaging. A cached media resource may be reused for a content URI if the media resource exists in the cache and optionally hasn't expired according to caching directives. The media cache is preferably an intermediary component between the messaging module and a media processing server (e.g., a transcoder) used to generate the media. In one variation, the media cache caches final formatted media, in which case cached media may depend on content URI, the messaging protocol, the destination device, and possibly cache expiration directives. Additionally, or alternatively, a preliminary or intermediary media resource may be cached for any suitable stage. A cache may store original media resources as they are retrieved from the content URI. A cache may store media resources in a partially processed form such as after transcoding but before converting to a device compatible format. The caching of media resources can preferably alleviate the need to reproduce duplicate media resources when bulk messages are sent out. For example, an application may want to send the same MMS message to a plurality of devices. The first MMS message preferably results in the generation of the media resource. The media resource is preferably subsequently cached, and following MMS messages that specify the same content URI will use the cached media resource.

Step S240, which includes delivering the media, functions to provide, transmit, or otherwise output media content derived from the media content URI. Preferably delivering media includes transmitting a media message of the media resource. The transmitted multimedia message preferably uses the media resource converted/generated in Step S230. Block S240 is preferably substantially similar to block S150. The multimedia message is preferably transmitted in a manner substantially similar to the transmission of a MMS message. The multimedia message content is formatted into specified MIME format and forwarded to a multimedia message service center (MMSC). The multimedia message then is transported through the MMS network to the destination device. The multimedia message may alternatively be delivered using SIP, a client messaging protocol (e.g., an OTT service provider), or any suitable messaging protocol or protocols.

Figure 19:
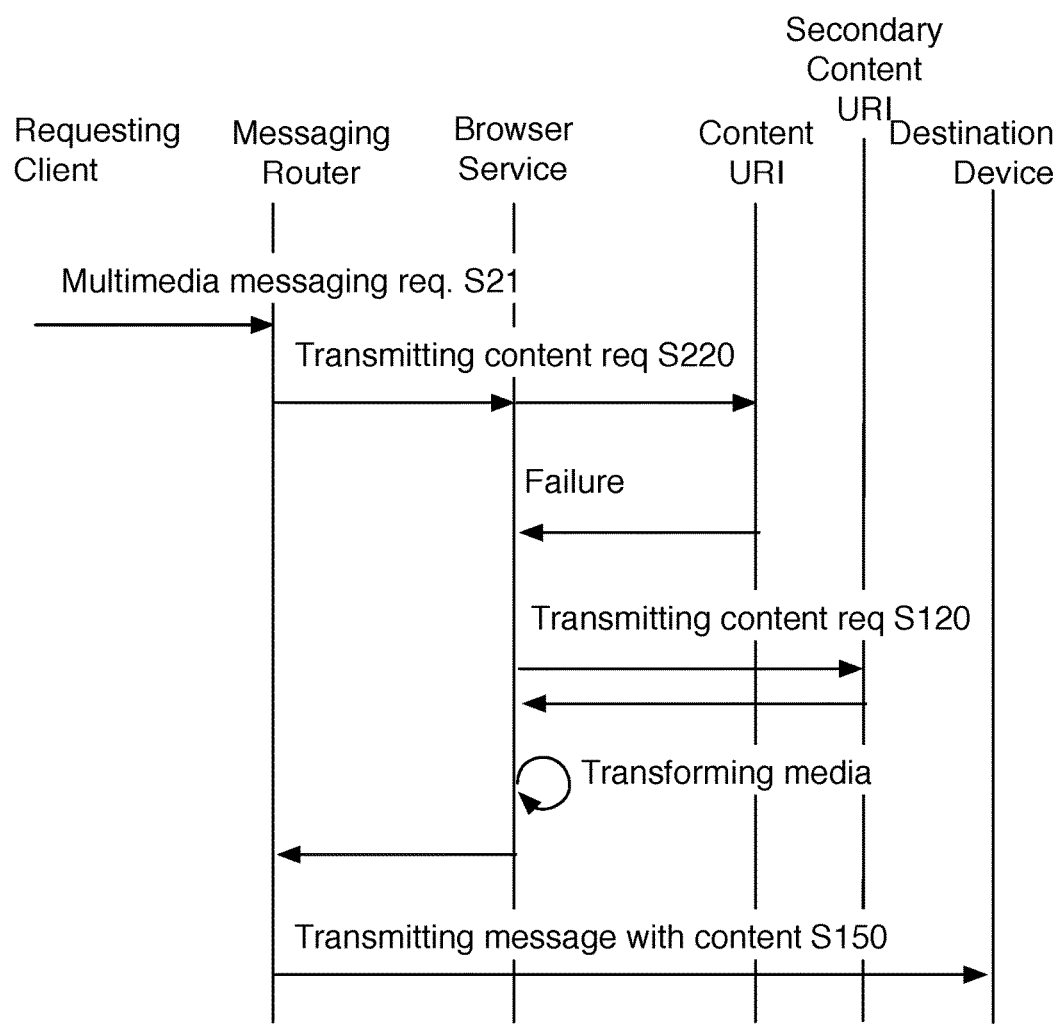
FIG. 19 is a communication flow representation of a variation of a method of a preferred embodiment.

As in the method S100 above, the method may additionally include triggering a callback during multimedia messaging. The callback is a secondary URI that is delegated operation and/or notified of an event during the processing of an outgoing multimedia message. The callback is preferably characterized in the form of a callback URI. The callback URI is preferably for an outside application URI but could alternatively be for an internal resource or any suitable resource. An HTTP message is preferably sent to the callback URI when the associated event is detected. In one variation, the callback can preferably function substantially similar to that of method S100. Additionally, the secondary URI may be a fallback URI if accessing of the URI fails or otherwise encounters an error. The secondary URI is preferably for an alternative media resource. As shown in FIG. 19, if retrieving the media resource fails, the system can attempt a second time from a different URI. Alternatively, the fallback URI may access error handling communication application logic, which can handle the error in any suitable manner.

Additionally the method can include converting transmitted messages into messaging API resources, which can function to provide status information and historical record of delivered messages. Additionally, the transmitted media can be hosted and exposed for public use of the media in other contexts.

4. Method for Processing a Media Messaging Application

Figure 15:
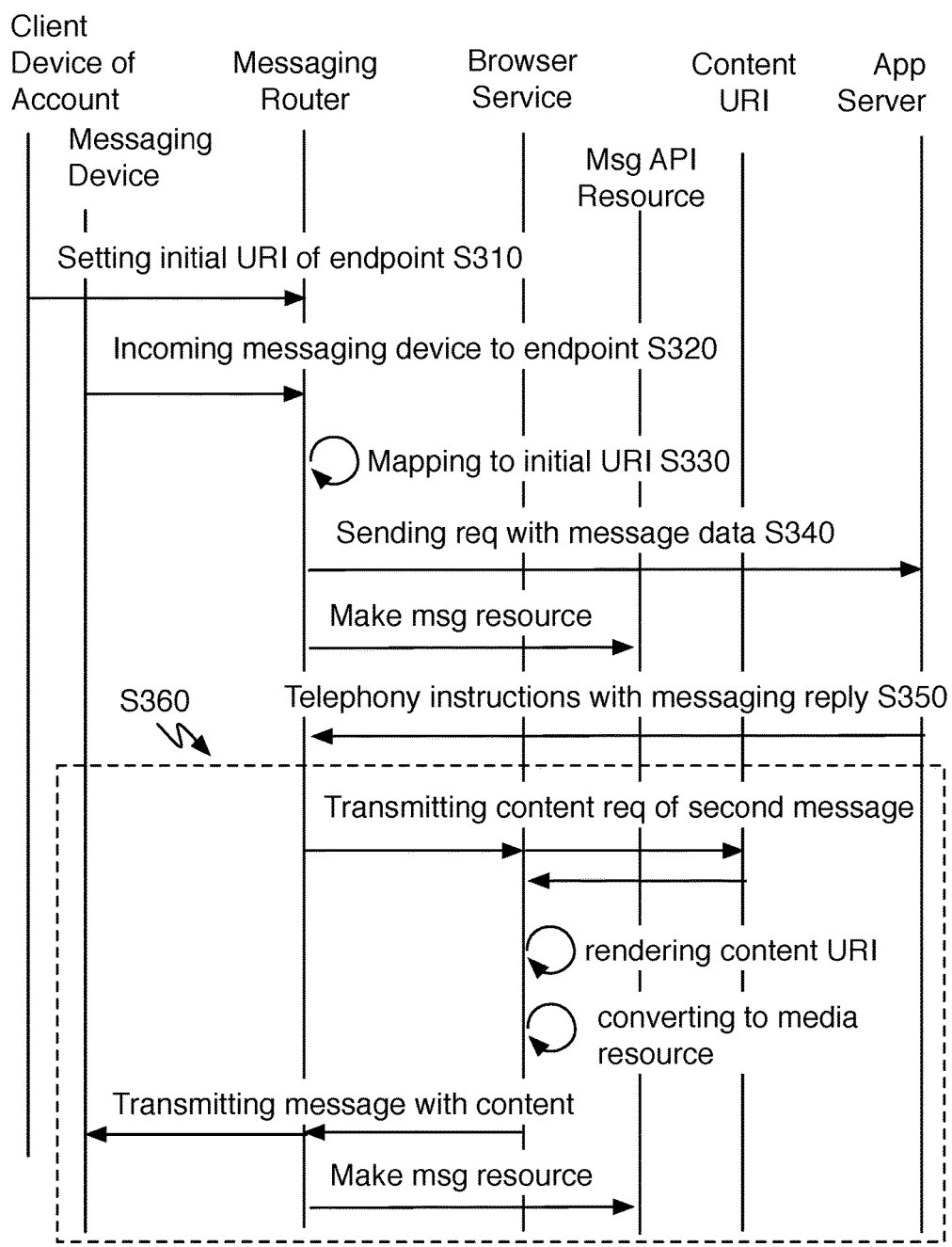
FIG. 15 is a communication flow representation of a method for processing a media messaging application of a preferred embodiment.

As shown in FIG. 15, a method S300 for processing a media messaging application of a preferred embodiment can include associating an initial URI with a messaging endpoint S310; receiving an inbound message directed at a messaging endpoint of the communication platform S320; mapping an initial URI to inbound message S330; sending a request to an application resource specified by the URI S340. The method can additionally include receiving a response from the application resource S350, and processing the response of the application resource on the communication platform S360. The method functions to enable inbound multimedia messages to be used and accessible by applications using a communication platform. The method is preferably used within a communication platform in combination with the above method. For example, a communication platform can preferably allow outbound messages to be initiated asynchronously over an API and for incoming calls to synchronously receive a response from an application. The method can be used to respond to a message, to execute an application on the communication platform, for an application server to take internal action, or to make any suitable response to an inbound message.

Block S310, which includes associating an initial URI with a messaging endpoint, functions to create a mapping between inbound communication and a resource responsible for processing the inbound communication. The initial URI is preferably pre-defined for a given messaging endpoint. For example, an account can add an initial URI as a configuration for an endpoint managed by the platform. Alternatively, initial URIs can be programmatically assigned. As described above, an initial URI can be a message handler URI that was assigned in response to a multimedia messaging request. The message handler URI is associated with inbound messages directed at a destination endpoint and originating endpoint. The inbound message and the originally transmitted multimedia message request preferably have mirror origin/destination endpoints. In other words, the new inbound message has endpoint characteristics indicating a response to the outbound message. Initial URIs can additionally be specified for different types of messages such as text messages, image messages, video messages, document messages, or any suitable type of message. In one alternative, an application identifier may be used in place of an initial URI. The application identifier can add an additional layer of indirection to association an initial URI with the messaging endpoint. The initial URI is preferably an address to an application resource that returns communication instructions. Alternatively, the application resource returns a document to be converted into a media resource for messaging using the method above.

Block S320, which includes receiving an inbound message directed at a messaging endpoint of the communication platform, functions to receive a message. The communication platform will preferably include a plurality of endpoints that it manages. Outside communication networks route to communications directed at those endpoints to the communication platform. The inbound message is preferably received over a messaging protocol such as SMS, MMS, IP chat protocol, or any suitable protocol. Once received, the communication platform can route communication to a message router that interfaces with an application server of an account. Messages can be accompanied with media content or references of the media content. The media content can include text, images, video, documents, multimedia, or any suitable form of media. The media content can additionally include multiple media items. The message is preferably processed and transformed into a multimedia message resource, which is made accessible through an API.

Block S330, which includes mapping an initial URI to the inbound message functions to identify a URI to handle the inbound message. The initial URI can be a default URI used to handle inbound messages, but can additionally be a specified URI based on the properties of the initial URI. A message handler URI is preferably dependent on origin and destination and optionally a conversation time window.

Block S340, which includes sending a request to an application resource specified by the URI, functions to transmit a message to an account specified resource and obtain an application resource from a server. The server is preferably a third party server and, more preferably, the server is running a web application. The request preferably encapsulates at least a portion of the state information from the initiated telephony session, such as the originating endpoint, the destination endpoint, the date and time of the message, a message identifier, an account identifier, text body of a message (if one exists), and media properties. The media properties can include a count of media objects, a list of URIs of media items, a list of media content types, and any suitable media properties. The state information can additionally include geographic location of the caller (e.g. country, city, and/or state, zip), and/or the unique call ID. The request can encapsulate all the state information of the message.

The state information from the initiated telephony session is preferably sent via HTTP POST in the request body, HTTP GET in the request URI, or in HTTP header parameters to mimic the data flow of a web browser, or by any combination or suitable alternative way. Preferably, new state information is not kept or acted upon internally by the message router, but is passed to the application server for processing. For example, subsequent message replies can initiate additional requests to the application resource. Alternatively, partial state information is preferably stored on the message router until a fully updated state is achieved, and then communicated to the application server.

Upon receiving the request, an application server can take various actions. In one variation, an application server can acknowledge receipt of the response, but not provide further direction. An application server can be configured by an account operator to perform some action within the application server system in response to the request. The request can act as a notification of a received message. The application server can asynchronously access the message at a later time additionally using the messaging API resources. In another variation, the application can respond with content directing an action of the communication platform. The content can result in several different responses including processing instructions of the content, executing the media retrieval of method S100, sending a text message, or any suitable response.

Block S350, which includes receiving a response from the application resource, functions to obtain direction by the application server. The response can result in different actions depending on the content-type of the response. In one variation, the response includes an application instruction document, which includes a series of instructions that can be interpreted by the communication platform into actions. Preferably, the application instruction document is in the form of a structured document such as an XML document. In one variation, at least a subset of the instructions is processed sequentially. The communication instructions can specify a text response, a media response (which may trigger the method S100), sending a text or media message to a different destination, making a phone call, or performing any suitable action. In another variation, the response can be a media response with a multimedia content-type such as an image format, video format, or other format suitable for messaging. Such media may be transformed into a device appropriate media format through method S100, but the media may alternatively be sent as a response message if the content type is not supported. If the response is plain text then the text can be used in a text message. If the plain text includes a link, then that link may be converted into a media object through method S100. If the content is a web content document such as an HTML or XHTML and the status code indicates success (e.g., a 2XX based code or 3XX redirection), then the above method may convert the web content into a media object and transmitted as a response. Conversion of web content to media may depend on identifying a header or other predefined indicator in the response of the application resource, which may prevent unintended webpages to be converted to media without explicit indication. For example, a customized header tag may be required to trigger the media rendering of web content, otherwise the response may be treated as an error.

Block S360, which includes processing the response of the application resource on the communication platform, functions to act on the received response. The processing is preferably selectively determined based on the content type. If the content-type is a document of application instructions, block S360 can include sequentially interpreting instructions and executing communication actions. The instructions can include communication actions outside of messaging such as initiating a synchronous voice call or video session. The instructions however preferably include instructions for transmitting a message. The messaging instructions preferably provide similar functionality as the messaging API request mechanism. Multimedia message content can be specified by content URIs. An instruction can additionally specify a destination endpoint (or destination endpoints), an origin endpoint, a message handler URI, and any suitable additionally parameters. As shown in FIG. 16, the messaging instruction can be structured as a verb acting on different types of messaging content, in this case body text and media file objects. Transmitting a message is preferably performed in a manner substantially similar to the method above (e.g., Blocks S120, S130, S140, and S150). If the content-type is a media file, the media can be used as content for a response message transmitted to the sender of the inbound message. The method above can be modified to use the media response as the content source.

5. Method for Interfacing with a Messaging Platform

A method S400 for interfacing with a messaging platform of a preferred embodiment can include accessing messaging records S410, and accessing message data S420. The method functions to expose information and/or functionality of a message router of a communication platform. The method is preferably used in combination with a method for processing media messaging application to enable an asynchronous programmatic approach to message related interactions. The method can be used for sending new outbound messages, and for reviewing information and history of messages. Alternatively, a communication platform can provide only an API and not enable processing of a set of messaging instructions. The blocks of the method can be used in any suitable combination. Messaging resource of the API can additionally enable media hosting capabilities, which can compliment the media communication of the platform. Method S400 can be used in combination with the method S100, S200, and/or method S300. As discussed above, one variation of method S100 may include providing a media service API that is distinct from messaging. Method S400 may be applied in a similar manner.

Figure 17:
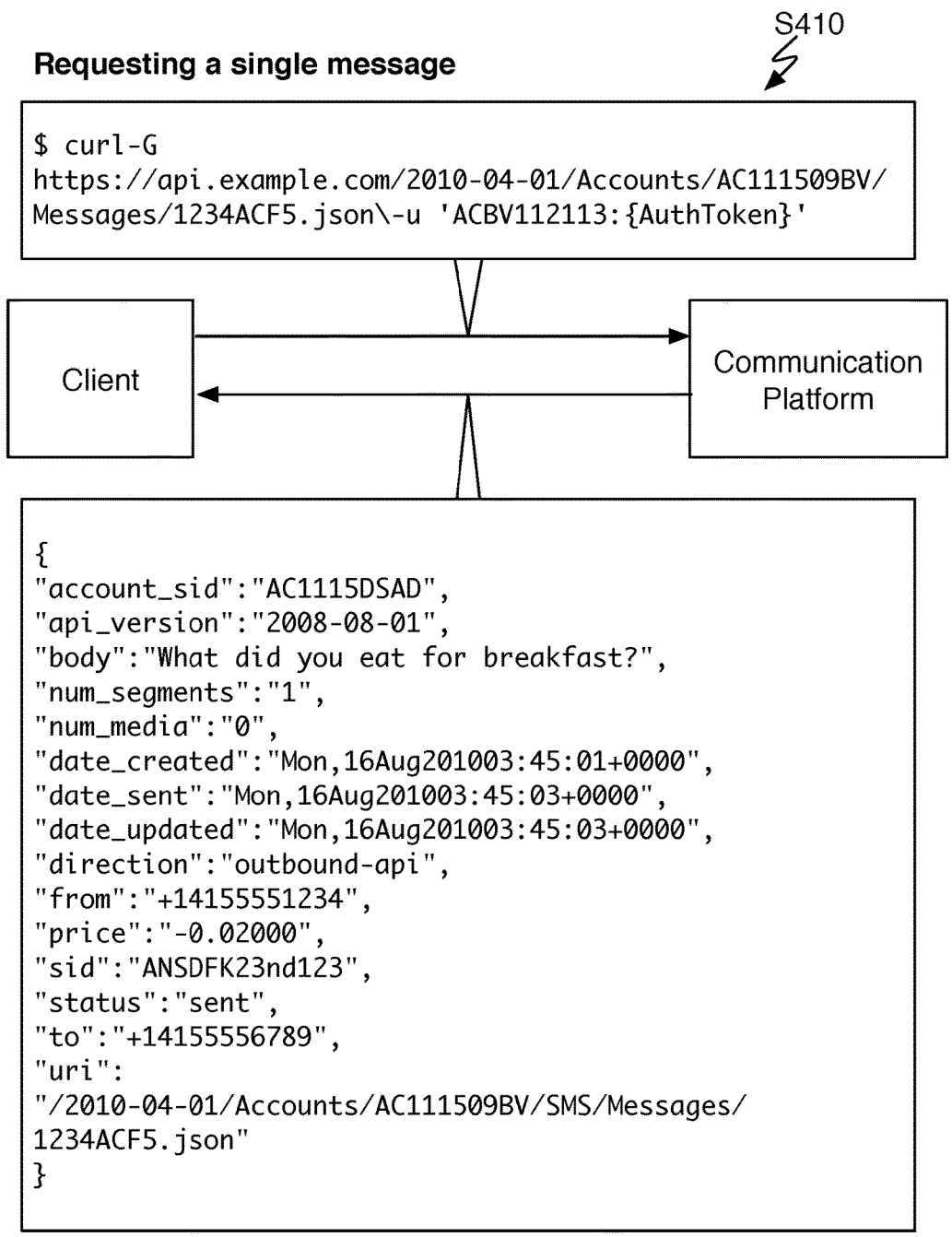
FIG. 17 is an exemplary communication of interfacing with message records of a preferred embodiment.

As shown in FIG. 17, block S410, which includes accessing messaging records, functions to obtain message data of a series of messages. By messaging a messages resource of an account, a client device can obtain a list of messages. In one variation, filters can be applied to messages matching a specified characteristic. Filters can be based on date of message, destination address, origin address, content type, content source URI, media content properties, or any suitable property of a message. Additionally, an API resource may exist to query an account for a set of associated messages. The query result may include a list of different messages. The individual messages can be individually accessed as resources. In a media focused embodiment, block S410 may be implemented by accessing media records. In this alternative embodiment, the API is to the set of media resources generated or otherwise associated with an entity (e.g., account). The media items can be substantially similar to messaging records.

Figure 18:
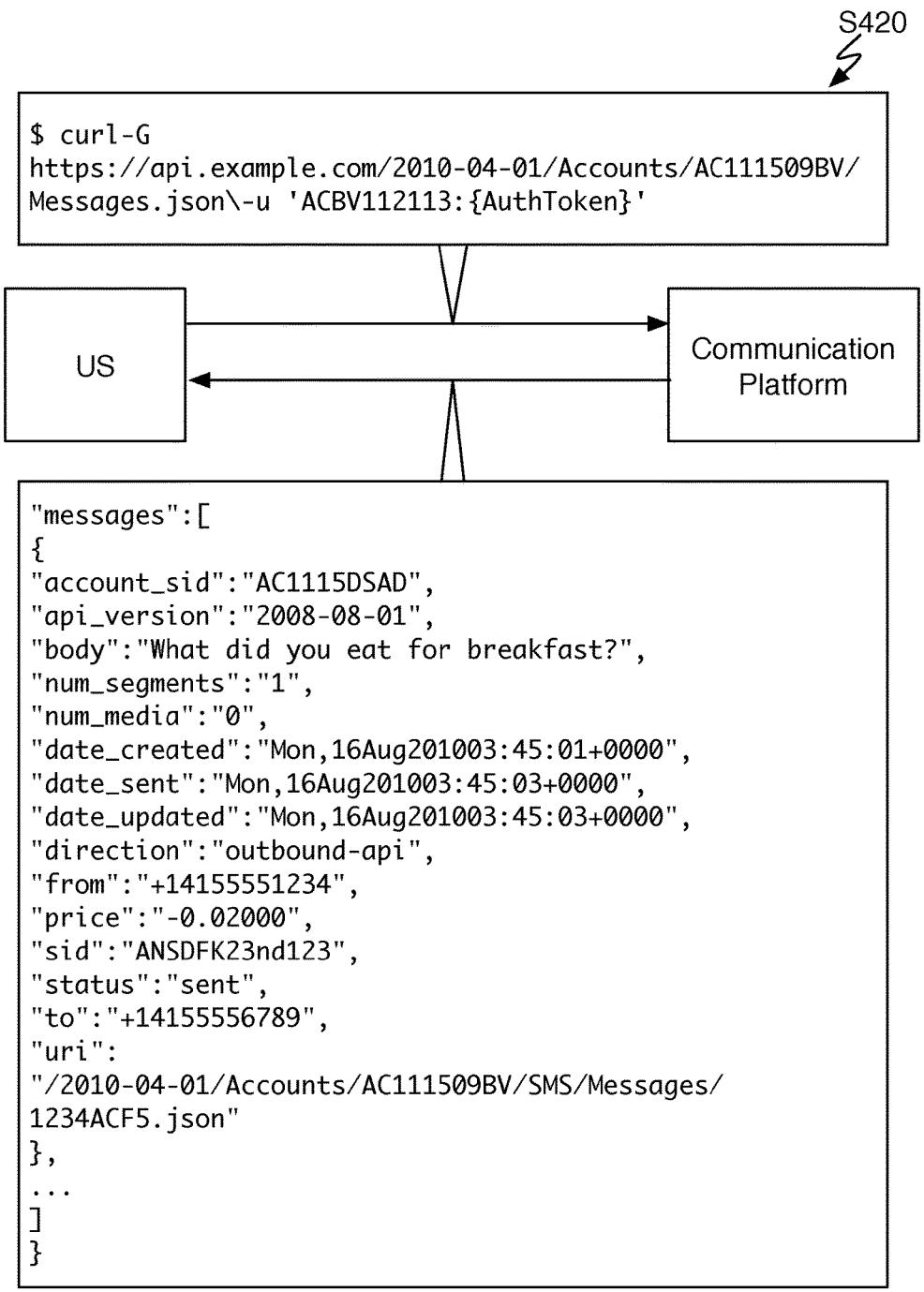
FIG. 18 is an exemplary communication of interfacing with message data of a preferred embodiment.

As shown in FIG. 18, block S420, which includes accessing message data, functions to access an individual message and associated metadata/properties. Individual API resources can be created for each message data item. The message resource can include origin endpoint, destination endpoint, message content, media properties, message delivery status (delivered or not delivered), and/or any suitable type of media. Media resource properties can include a media type, media format, a media source, media size, media characteristics (e.g., image color properties, audio duration, video definition, etc.), and/or any suitable media property. Media can be associated with an identifier of the messaging request. The media resource properties can additionally include a URI referenced in generating the media. The method S400 is preferably used in combination with method S100, and at least a portion of the media items can be created through method S100. Control parameters applied when obtaining/generating the media resource can similarly be accessible. Associating the media with the messaging request abstracts messaging actions away from underlying message transmission. For example, a request to message two images to a destination can be sent as two different MMS messages, but the two images are preferably associated with the same message identifier assigned to the original messaging request. The media messages can additionally be exposed outside of API authentication. The media files can be accessed through a public URI, which may be partially randomly generated to hide account information from the public URI. Messaged media files may want to be shared beyond entities with API access, and as such requests to access a URI of the transmitted media file do not require authentication tokens or credentials. API access of other media messaging resources, however, can include a security layer of account authentication.

The exposed media URI can be used to enable fallback media sharing for devices without media messaging capabilities. The URI of the media can be messaged over SMS in place of an MMS message for example.

In one variation, inbound messages may not be handled synchronously, and inbound messages are added as message API resources. The communication platform can publish a notification, access a callback URI, or otherwise notify an application server of an account of received messages. In one implementation, a count of newly received inbound messages is notified. The application server can then programmatically access the new messages and take any suitable action. This is an example of managing inbound messages asynchronously.

6. System for Providing a Telephony Endpoint Information Service

Figure 20:
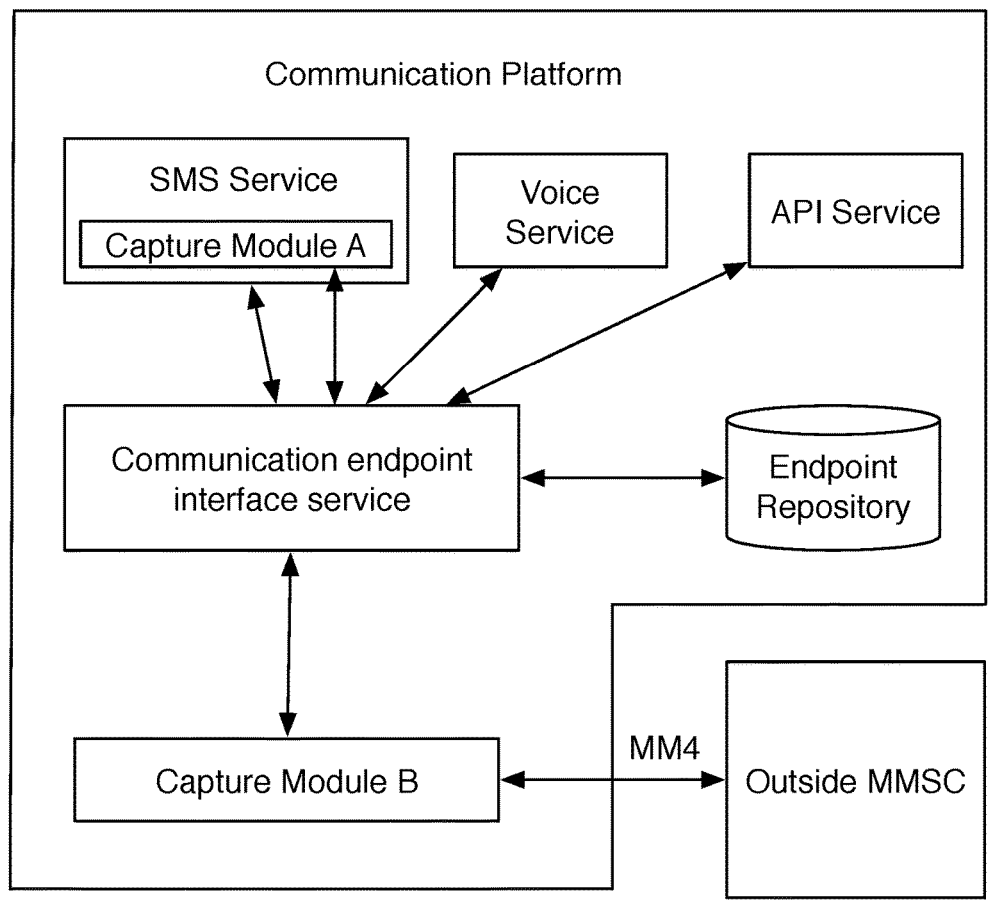
FIG. 20 is a schematic representation of a system for providing a telephony endpoint information service in a variation of a preferred embodiment.
Figure 21:
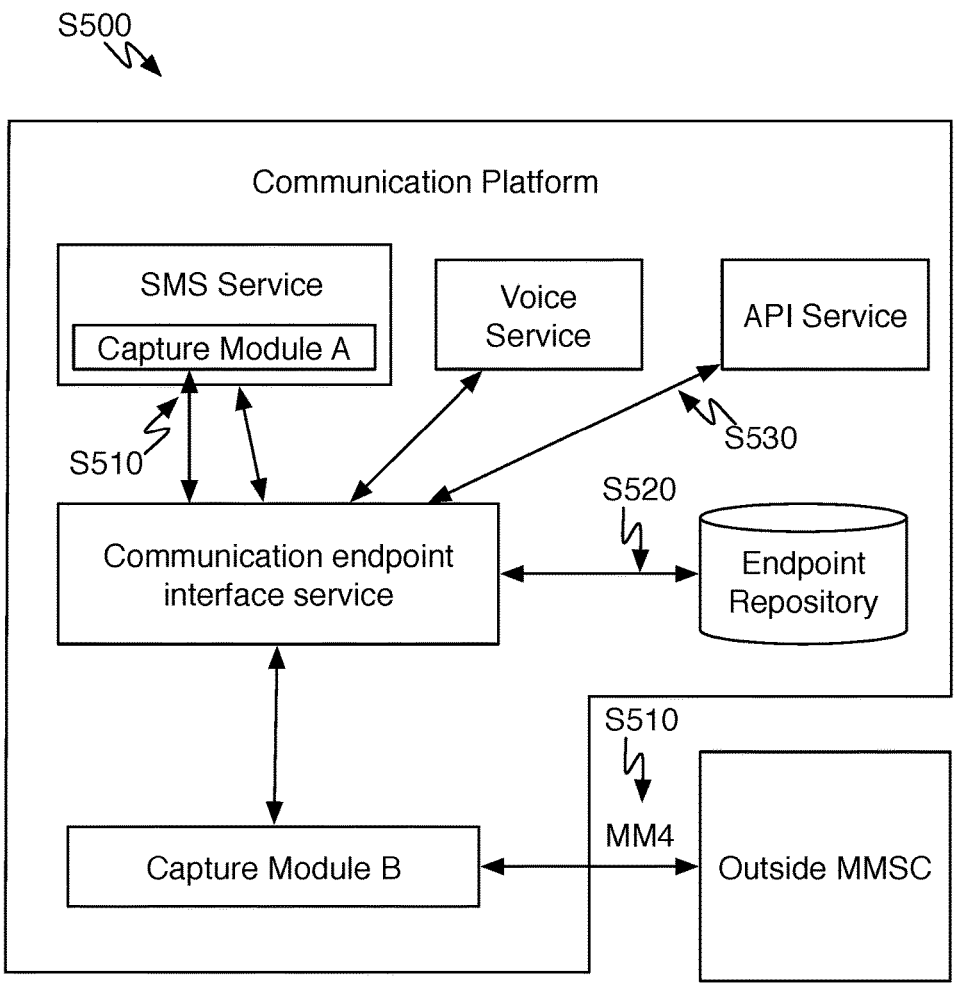
FIG. 21 is a schematic representation of the variation of providing a communication endpoint information service.

As shown in FIG. 20, a system for providing a communication endpoint information service of a preferred embodiment includes a communication endpoint interface service of a communication platform and a communication endpoint repository. The system functions to enable information of communication endpoints to be collected, accessed, and used in operational logic of a communication platform. Since capabilities can vary greatly between the devices assigned to communication endpoints, the system preferably enables capabilities to be tracked and used in operation of the communication platform. The system is preferably used in combination with a system implementing a media service method described above. Also, the current user/owner of a communication endpoint can influence how communication should occur (e.g., what is the native language of the user). The system is preferably incorporated into a communication platform that provides capabilities of communicating or interacting with a communication endpoint. The communication platform is preferably substantially similar to the one described in U.S. Pat. No. 8,306,021, issued 6 Nov. 2012, which is hereby incorporated in its entirety by this reference. The communication platform can alternatively have any suitable architecture or functionality. In one variation, the communication platform facilitates communicating media messages to various endpoints (e.g., provides an API for programmatic MMS messaging). The capabilities of a device to render the media message may impact how and what media is communicated to the communication endpoint. The system and the communication platform are preferably implemented on a cloud hosted computing environment, but may alternatively be implemented on a computing cluster or any suitable network accessible computing environment. A communication endpoint (or endpoint for short) is preferably an address to which PSTN, SIP, SMS, MMS, and/or client application communication can be directed. A telephony endpoint is one preferred type of communication endpoint, and telephony endpoint can be a phone number, a short code or any suitable address type compatible with the telephone system. A client endpoint can be a SIP address (e.g., sip:username@example.com:port), an IP address, or any suitable address type. Additionally, the system is preferably configured such that information of a communication endpoint can be continuously or periodically updated to contribute new or changing information.

The communication endpoint interface service (or interface service for short) functions to provide a service interface for interacting with communication endpoints. The interface service is preferably an intermediary component between the communication endpoint repository and components of the communication platform. The interface service preferably includes an application programming interface (API) that can be used by other components for interacting with records of telephony endpoints. The API interface acts as an intermediary abstraction layer between stored communications and various services of the communication platform. The communication endpoints can be endpoints owned, hosted, ported, terminated, and/or otherwise operated by the communication platform, but the communication endpoints may alternatively or additionally be outside communication endpoints operated by outside entities. Even if the communication does not terminate the communication endpoint, information of the endpoint can be observed and collected through communication that passes through the communication platform to and from that communication endpoint. By implementing the interface service in front of the endpoint repository, the components of the communication platform are independent of the inner functionality and organization of the endpoints. New features and capabilities can be added while gracefully degrading for communication endpoints that lack updated information. The interface service preferably abstracts access to communication endpoint information. Any request to inspect, call, message, start a session, request a new number, create, port, delete, and/or interact with an endpoint preferably passes through the interface service. Multiple instances of the interface service can additionally be deployed to scale the service according to demand.

The API of the interface is preferably a RESTful API but may alternatively be any suitable API such as SOAP. The API preferably works according to an HTTP request and response model. HTTP requests (or any suitable request communication) to the management service 110 preferably observe the principles of a RESTful design. RESTful is understood in this document to describe a Representational State Transfer architecture as is known in the art. The RESTful HTTP requests are preferably stateless. The components of the communication platform and/or the interface service preferably do not need to remember or store previous communications to be aware of the state. In a preferred implementation, components of the communication platform preferably call out to the interface service when interacting with a communication endpoint. In one example scenario, if the communication platform is processing a request to send a message (e.g., SMS or MMS), a messaging service, for example, can call out to the interface service to inspect properties that may impact the messaging. The supported media types and capabilities may result in altering the media delivered to the device of the communication endpoint. In another example scenario, if the communication platform is processing a request to start a synchronous communication session (e.g., PSTN, SIP, video, screen sharing or other form of communication session), a service can call out to the interface to inspect properties of the destination endpoint and modify the communication session initiation or the communication session.

The communication endpoint interface service can additionally include or communicate with information capture modules that function to retrieve, collect, and/or produce information of various communication endpoints. The capture modules may be a script routine or process operable on the interface service. Alternatively, the capture modules may be implemented in cooperation with another server and/or other suitable computing device. Various capture modules may be used in cooperation or individually. A first preferred capture module is a carrier information query module, which functions to access outside carrier information of the communication endpoint. The carrier information query module is preferably configured to communicate using MM4 or MMSC to access endpoint information from outside carriers. Alternatively, if the communication platform is the MMSC then the information may be accessed directly from within the communication platform. Another preferred capture module is a message protocol inspector module, which functions to pull information from protocol responses that contain information. For example, the MMS notification response may include device related information that can be captured and stored. Another capture module is a resource access monitor module, which functions to use ancillary hosted resources that correlate with communications to obtain information. Ancillary hosted resources can include media hosting, link redirecting service (e.g., link shortening), two-factor authentication service, and/or other hosted resources/services. The ancillary hosted resources are preferably used in combination with communications to an endpoint, and then a recipient of the communication will access the hosted resource using an application or browser. This out-of-communication access can be mapped to the device used in the communication, and information from this access can be associated with the communication endpoint. Another capture module is a content monitor module, which functions to inspect the communications (context and content) occurring within the communication platform, and detecting patterns in the communication. The content monitor module can be used to identify language patterns, if certain types of messages failed, preferred communication endpoints (e.g., who and where does a particular communication endpoint communicate with).

The telephony endpoint repository functions to store communication endpoint data. A communication endpoint preferably has a record stored in a database or distributed through several database tables. An endpoint record may include various properties of a communication endpoint such as a unique identifier of the telephony endpoint, the direct inbound address (e.g., the phone number or short code), carrier, origin properties, a cleanliness/quality score, capability properties (e.g., SMS, MMS, Fax, etc.), status (e.g., mobile, landline, client application type, toll free, etc.), screen resolution and display capabilities, language, service plan (e.g., do they get free SMS/MMS messages), activity patterns (e.g., when is the communication, who does the endpoint communicate with, what does the endpoint communicate, etc.) and/or other suitable properties of a telephony endpoint. Origin properties can include NPs (e.g., area code), NXX (e.g., three digit vanity digits of a number), ISO country codes, region properties and/or any suitable origin properties. The records may include various sets of information depending on the information that is collected.

2. Methods for Providing a Telephony Endpoint Information Service

As shown in FIG. 2, a method for providing a telephony endpoint information service of a preferred embodiment can include obtaining information of a telephony endpoint S510, storing the obtained information S520, and providing a communication endpoint interface service S530. The method functions to enable information of communication endpoints to be collected and accessed in a communication platform. The method can further function to unify several disparate types and forms of information relating to a telephony endpoint and transform the information into an actionable resource within a platform. The method is preferably implemented by the system described above in combination with the messaging service system and method, but any suitable system may alternatively be used to implement the method. Within the system above, the provided communication endpoint interface service can be used internally with a communication platform. Additionally or alternatively, the interface service can be exposed to outside partners, registered users, and/or the public. Not only can the method be used to collect information about communication endpoints owned, operated, and managed by the communication platform, but also the method may be used to construct a wide communication endpoint knowledgebase that expands to communication endpoints owned and operated by other parties.

Block S510, which includes obtaining information of a telephony endpoint, functions to retrieve, collect, and/or produce information of various communication endpoints. Information is preferably obtained from multiple sources and can employ multiple processes to obtain the information. The type of information can apply to various properties of the communication endpoint. Preferably, the obtained information relates to functional and usage-based information such as the carrier, origin properties, a cleanliness/quality score, capability properties (e.g., SMS, MMS, Fax, etc.), status (e.g., mobile, landline, client application type, toll free, etc.), screen resolution and display capabilities, language, service plan (e.g., do they get free SMS/MMS messages), activity patterns (e.g., when is the communication, who does the endpoint communicate with, what does the endpoint communicate, etc.) and/or other suitable properties of a telephony endpoint.

The communication endpoint interface service preferably updates information when the communication endpoint is encountered during operation of the communication platform. A communication endpoint is encountered when attempting to make an outgoing communication from the communication endpoint, when receiving an inbound communication directed at the communication platform, when asynchronously querying information of the communication endpoint, and at other various steps in operation of the communication platform. The communication can be synchronous (e.g., PSTN call, SIP, video, screen sharing, etc.) or asynchronous communication (e.g., SMS, MMS, instant messaging, or media messaging). The communication endpoint interface service, as described above, is preferably an intermediary layer used by other services of a platform. API calls are preferably made to inspect various aspects like routing information, application URI's, and other information. The interface service preferably uses inspecting of the API calls to trigger some events. An eventing system may be used to inspect and respond to various types of API calls. Other components (i.e., capture modules) may be integrated into other portions of the system so that information can be reported back to the records of the communication endpoint repository. The obtained information can be obtained/updated periodically, during initial access of the telephony endpoint, during any action that touches or augments a record of a telephony endpoint, or at any suitable time. Some basic information, like carrier information, may be obtained upon adding/porting the communication endpoint to the communication endpoint. In one variation, communication endpoints are tested (e.g., functionality tests) or measured for cleanliness, and these quality scores can be added as a parameter of communication endpoint information. Obtaining information of a telephony endpoint can include querying outside telephony information services, extracting information from a message notification response, synchronizing resource access of messages, aggregating usage history information, and/or other techniques for acquiring information about a communication endpoint.

Querying outside telephony information service functions to aggregate information from an existing information database. Carriers can provide APIs for accessing basic information of a communication endpoint. Querying an outside telephony information service can include using an inter carrier protocol such as MM4. Alternatively, the information may be accessed from an MMSC. In another variation, the method may be implemented by an MMSC and thus the information is available from within the system. In one exemplary scenario, a MMS module may be prompted to send a MMS message. The MMS module, upon determining a destination endpoint, preferably calls out to the communication endpoint interface service to determine properties of the destination endpoint. If the information is not already stored, the endpoint interface service can access carrier information through MMR for the destination endpoint. This information may include carrier network of the destination endpoint, if the device is MMS enabled, and if the endpoint has a messaging plan. The information about the destination endpoint can be used in determining if and how a message is delivered.

Extracting information from a message notification response functions to use messaging protocol response messages in determining information about the receiving device. Preferably, transmitting an MMS message includes message passing that includes information about the destination endpoint. The relevant information is preferably extracted from the protocol messages and stored in record for the destination endpoint. When transmitting a MMS message, a MMSC will determine if the destination is MMS capable. In some instances, the response messages can include header information that specifies or indicates information relating to the receiving device. For example MM7 protocol communication, user-agent information can be obtained through use of the protocol. Similarly, MM4 can be used to obtain information from inbound messages. In particular, the acknowledgment messages delivered during handshaking of MMS messaging can include a user agent related header field. Extracting information from message notification response may include integrating with communication components. The communication component preferably synchronizes desired information with the communication endpoint interface service or the endpoint repository. In the above example, a MMS messaging module handles the messaging protocol and transmission of multimedia messages. The MMS messaging module may expose a programmatic hook to observe the acknowledgment header information. Alternatively, the MMS messaging module may actively call out to the communication interface service when a protocol message with desired information is identified. Information from message notification responses can preferably be extracted from any suitable destination endpoint. For example, user agent information can be collected for outside communication endpoints as well as owned communication endpoints.

Synchronizing resource access of messages functions to use access of external media by a first device to correlate to the device of the destination endpoint. This variation of obtaining information preferably involves employing a secondary service that works with or facilitates transmission of a MMS, SMS, or alternative form of device message. The message will preferably include a reference to a platform-hosted resource. The platform-hosted resource is preferably linked or referenced such that a second application is used to open the link. There are various ways of using a platform-hosted resource to result in second application access from which information may be obtained. In a first variation, a link shortening service is provided by the communication platform. Any SMS or MMS messages that pass through the communication platform preferably convert links to unique proxy URI's. The URI is preferably unique to the particular destination endpoint so that any access of the link can be correlated with the particular destination endpoint. When a user accesses the URI (e.g., activating the link displayed in a text messaging app), a browser opens up the shortened link on the device. During a browser session, the user agent, screen size, location information, and other information from the HTTP headers, JavaScript or other suitable techniques can be collected. In another variation, a token validating service can be used in combination or within the communication platform. The token validating service is preferably used for pin codes in two-factor authentication, but may be used for other application based code functionality. The token validating service will preferably generate a unique token/code for a destination endpoint. The token is preferably transmitted to the destination endpoint. The token code can then be entered into a mobile application that is assumed to be on the same device as the device of the destination endpoint. Information is preferably collected from the device during this access. In another variation, the destination endpoint may be configured for use by a client application (e.g., a mobile application). The mobile app preferably transmits device information to the communication platform for association with the destination endpoint.

Aggregating usage history information functions to characterize and/or use activity with the communication endpoint to contribute information about the communication endpoint. Usage history preferably includes monitoring communications that involve the communication endpoint as an origin, destination, or other suitable participant of the communication. Various forms of information can be obtained from usage history. The usage history is preferably used to characterize communication patterns or identify signals indicating capabilities. The usage history is preferably obtained through the communication platform.

In one variation, the type of communications and the number of those communications can be used as a signal of communication abilities. Making outgoing communications is preferably a strong signal that the communication endpoint is configured to use that form of communication. For example, if a number of SMS messages originate from the communication endpoint, then that communication endpoint can be indicated as being SMS capable. This can similarly be performed for MMS, client messaging protocols, voice calls, video calls, screen-sharing calls, and/or any suitable form of communication. Furthermore, the number and/or frequency of the communications can be used to form a measure of those capabilities. This can function to infer phone plans for a communication endpoint without full visibility into the carrier contract of that endpoint. In one exemplary scenario, a first communication endpoint sends only one or two SMS messages in a month, and a second communication endpoint sends five hundred in a month. The first communication endpoint is preferably marked as a low volume SMS capable communication endpoint (e.g., the user does not like SMS messages and/or does not have a plan that includes many messages), and the second communication endpoint is marked as a high volume (e.g., the user prefers communicating over SMS and may have a pre-paid SMS plan). The measure can be a categorization such as "low volume" and "high volume", but the measure can additionally be a numeric measure based on usage data.

In another variation, aggregating usage history information can include processing geographic preferences of a communication endpoint. Area codes and country codes can work to provide insight into the geographic region associated with a communication endpoint. Processing geographic preferences of a communication endpoint can function to infer geographic associations based on communication involved in the communication. The communication endpoints that call a first endpoint and/or the communication endpoints that are called by the first endpoint can be used to create additional geographic associations for the first endpoint. The additional geographic associations are preferably based on the number, percentage, and/or frequency of calls that involve particular geographic regions. For example, endpoint A may make numerous calls to phone numbers with area codes belonging to San Francisco, Oakland, and Springfield, Mo. Phone calls in lower numbers may occur with other various locations. In response to the high frequency and number of calls to San Francisco, Oakland, and Springfield, Mo., these three regions are added to an information field for the communication endpoint. Additionally, timing of geographic preferences may additionally be used to determine geographic preference based on day of the week, month, time of day, and the like. Similarly, the geographic preferences can be characterized according to the duration of the calls, content of the messages, variety of endpoints (e.g., communicate with the same five communication endpoints or never call the same number more than a few times.), or other suitable patterns form related communication endpoints.

Block S520, which includes storing the obtained information, functions to maintain a record for a communication endpoint. Obtained information can be for communication endpoints owned or operated by the communication platform, but may additionally or alternatively include outside communication endpoints. Information about outside communication endpoints is preferably obtained by the communication platform when the communication endpoint facilitates a communication involving the communication endpoint. For example, if a communication endpoint operated by the communication platform calls the outside communication endpoint, then information about that outside communication endpoint may be collected through that communication session. The information of the communication endpoint is preferably stored in a database system. The data structure for the information can be architected in any suitable manner. Preferably, a communication endpoint includes a number of basic parameters that can be completed through knowledge of just the address of the communication endpoint. A record for a communication endpoint can include the direct inbound address, carrier, country from country code, region from area code, screen resolution, service plan, SMS capability, MMS capability, voice capability, voice protocol (e.g., PSTN, SIP, etc.), video capability, screen sharing capability, device type, device applications, application, geographic preferences (e.g., who does the user communicate with), communication usage rates, user information, presence information (e.g., a communication endpoint simultaneously assigned to multiple devices), languages, and/or other suitable information. Some information of the communication endpoint is substantially static such as country code, and area code region. Some information may alternatively be continuously updated or change for various reasons.

Block S530, which includes providing a communication endpoint interface service, functions to enable access and interactions with the information of the communication endpoint. The communication endpoint interface service preferably provides an internal API used by the components within the communication platform. The API may additionally or alternatively be a public API. In one variation, a portion of the API can be exposed for public access. The public access API is preferably facilitated by a public API module for the communication platform, and the public API module fulfills endpoint information calls by using the internal API of the communication endpoint interface service. The API of the interface is preferably a RESTful API but may alternatively be any suitable API such as SOAP. The API preferably works according to an HTTP request and response model. HTTP requests (or any suitable request communication) to the interface service preferably observe the principles of a RESTful design. The interface of the communication endpoint interface service is preferably used for querying information of a particular communication endpoint. For example, an API call may request a True/False response indicating if the communication endpoint is MMS capable. Additionally or alternatively, the communication endpoint interface service can facilitate API calls that alter the information of the communication endpoint. For example, information feedback can be supplied through the API. Mutative API calls may be used by internal components of the communication platform that cooperate in obtaining information of the communication endpoint. In one variation, the API calls provide the supplemental information as a sub-resource of a communication. For example to obtain information about a device a REST API call may be sent to a URI of the pattern "http:// . . . / . . . /Message/{MessageSID}/DeviceInfo" or to obtain information about the carrier involved the URI may be "http:// . . . / . . . /Message/{MessageSID}/CarrierInfo". In another variation, an API may request a structured data file (JSON) with information about communication. The request can include a parameter to specify that the additional endpoint related information should be included in that structured data file.

The end obtained endpoint information can further be used in altering operation of a communication platform. In one exemplary use case, the operating system of a device of an endpoint may be obtained, and then the content type can be altered. For example, a developer application may submit a request with the intent of delivering a boarding pass. If the operating system is know and there is particular media type that supports boarding pass type content (such as a passbook application), then the content is converted into a passbook file format. The content is preferably reactively adapted based on the endpoints. This preferably abstracts away the complexities of multiple protocols for developers, and a developer can simply specify what their intent is for the communication. This can content adaption can similarly be performed for other forms of content such as calendars, tasks, multimedia files, maps, tickets, or other forms of content which may have specific device applications for handling.

Figure 22:
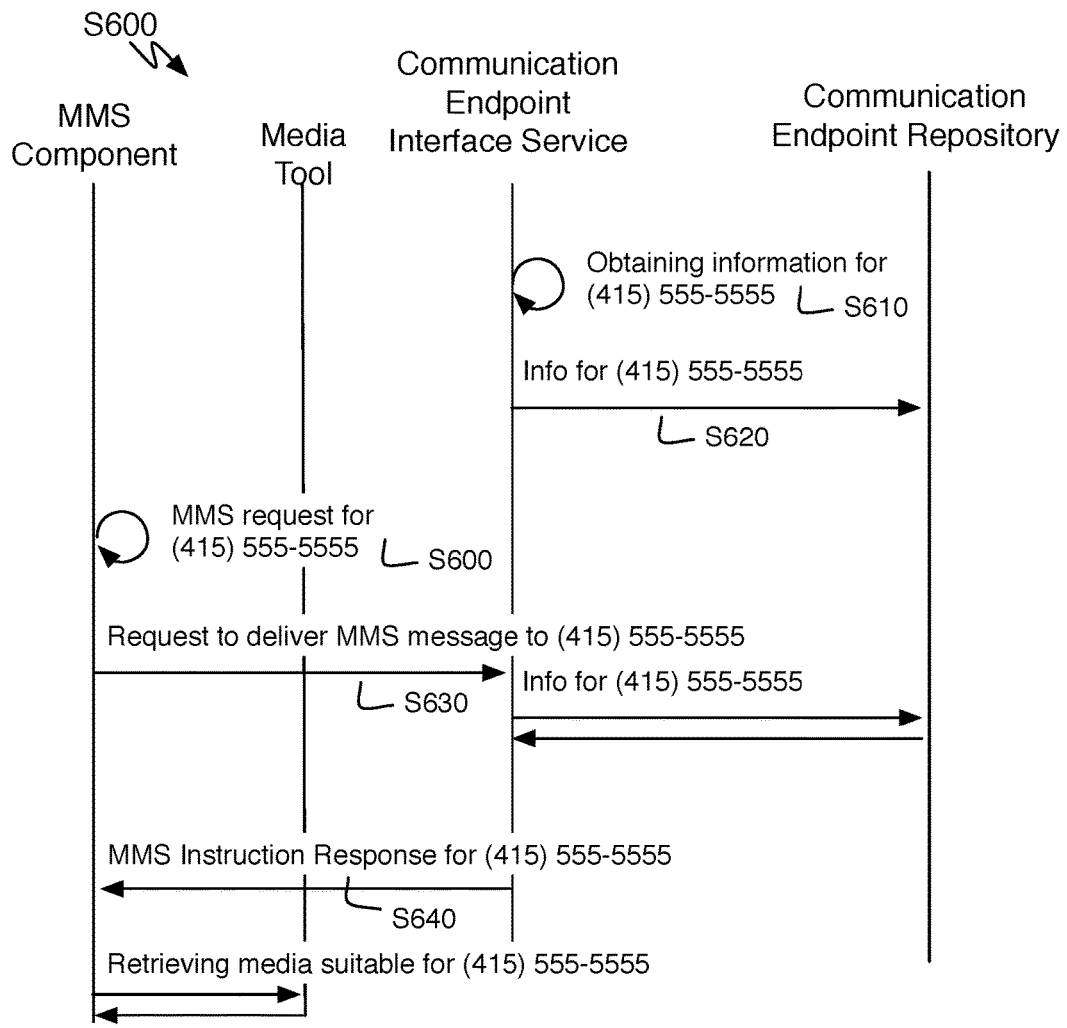
FIG. 22 is a schematic representation of a method of a second preferred embodiment.

As shown in FIG. 22, a method S600 for providing telephony endpoint information can include receiving a telephony endpoint query request of a communication event S600, providing a communication endpoint interface service S630, obtaining information of a telephony endpoint S610, storing the obtained information S620, and augmenting the communication event according to the obtained information S640. Method S600 expands upon the functionality of method S500 to enable information of communication endpoints to be collected, accessed, and automatically used in operational logic of a communication platform. In a preferred implementation, the method is used for multimedia messaging (e.g., MMS) applications, where the media can be customized to accommodate device capabilities for the receiving endpoint. Blocks S630, S610, and S620, function to create the endpoint repository. Blocks S630, S610, and S620 are substantially similar Blocks S530, S510, and S520, respectively. Preferably, information about a communication endpoint is collected prior to the communication that is augmented by the information. Alternatively, information about a communication endpoint can be collected on-demand (i.e., in response to or during a communication session). In addition to providing a communication endpoint interface service usable by various components, the interface service generated through blocks S610 and S620 can be integrated into operation of the communication platform in various ways.

Block S600, which includes receiving a telephony endpoint query request of a communication event, functions to initiate communication endpoint influence on a communication session. The communication platform is preferably used to facilitate an application (e.g., an automated phone service, phone tree, number redirection tool, and the like). The communication session (and possibly the application state) may be handed by a call router or other suitable component(s) of the communication platform. Prior to or during a communication session with a communication endpoint, the call router will make an internal API call to the communication endpoint interface service. The call is preferably made for information that will conditionally influence the state of the communication. In one variation, the components of the communication platform will simply request the information, the interface service provides requested information, and the components then use that information to determine a response. In this variation, the query request is preferably for particular types of information of a communication endpoint or endpoints. Alternatively, the interface service may enforce the actions involving a communication endpoint. In this variation, the action taken on the communication endpoint is communicated through the API of the interface service, and the interface service includes application logic to determine proper response to actions involving a communication endpoint. By centralizing the application logic to the interface service, a central policy can be enforced so that conditional logic based on communication endpoint information is kept consistent throughout the communication platform.

Block S640, which includes augmenting the communication event according to the obtained information, functions to react to the query request and alter a communication. In one variation, augmenting the communication event can include validating a communication request. For example, the endpoint capabilities of an endpoint can be validated prior to performing an action that depends on those capabilities. Various alternative communication options can be triggered if capabilities of the endpoint are not sufficient. If a communication cannot be completed, an error message or an alternative action can be triggered. For example, a MMS server may be prompted to send an MMS message to a destination endpoint. The information for the destination endpoint is queried and if the information indicates that the endpoint is capable of MMS communication, the MMS message is delivered. If the information on the endpoint indicates the endpoint is not capable of MMS communication, an error messages is delivered. In one variation, this response is delivered to a developer application. An option to send the MMS as a link in an SMS message can be an optional action from this error message. Similarly, options to attempt the MMS message disregarding the warning or to cancel the message may additionally or alternatively be option responses. In another variation, the media used in the communication can be customized to the capabilities of a device. Preferably screen size/resolution can be used to dynamically generate media prior to communicating the media to the endpoint. The smart media formatting can be used for MMS messages, but may additionally be used in video, screen sharing, or other rich media communications. In one implementation, a MMS component is prompted to transmit a MMS message. A media tool (e.g., such as a headless browser or an image rendering service) may be used to generate the image or media. The screen resolution of the device for the endpoint is preferably queried from the endpoint repository and delivered as input to the media tool. An image or other suitable media file is preferably dynamically generated or selected for delivery to the endpoint. If the device has a resolution of 320×480 then the image is preferably generated to that resolution and aspect ratio. If the screen resolution is 1024×768 then the image is generated for that resolution and aspect ratio. Alternatively, instead of generating the media, the media may be transcoded according to the information of the device. The information for the communication endpoint can additionally be used for automatic translation of messages to a preferred language of the communication endpoint; prioritize communications between calls, SMS, and MMS; alter communication routing within the system; change the content of communication; change frequency and timing of communication; and/or use the information in any suitable manner to alter the communication with the communication endpoint. The form of communication augmentation can be used in any suitable alternative manner.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the messaging service of a communication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for programmatically sending a media message from a communication platform comprising:
processing an application directive of a communication application that instructs the transmission of a multimedia messaging service message with a media resource to a destination endpoint, wherein the application directive of the communication application includes a specified media content universal resource identifier (URI);
retrieving a web document of the content URI, wherein the web document is requested while sending a set of MMS message context data and wherein the web document includes a specified control parameter, and retrieving a set of web content resources and at least one executable content referenced in the web document;
executing each executable content to generate a respective dynamic web content resource;
generating rendered content by rendering the web document, the set of web content resources, and each dynamic web content resource in a simulated browser view;
converting the rendered content into the media resource, according to the control parameter by creating at least one of audio, at least one image, and video from the rendered content; and
transmitting the media resource to the destination endpoint in a multimedia messaging service (MMS) message.

2. The method of claim 1, wherein converting the rendered content into the media resource comprises: taking a screenshot of the rendered content to generate the media resource.

3. A method for a communication platform comprising:
processing an application directive of a communication application that instructs the transmission of a message with a media resource to a destination endpoint by obtaining a set of web content resources;
obtaining the set of web content resources and at least one executable content associated with the application directive;
executing each executable content to generate a respective dynamic web content resource;
generating rendered content by rendering the set of web content resources and each dynamic web content resource by using a headless browser;
converting the rendered content into a media resource by creating at least one of audio, at least one image, and video from the rendered content; and
transmitting the media resource to the destination endpoint according to the application directive.

4. The method of claim 3, wherein obtaining a set of web content resources comprises receiving a hypertext markup language data object and retrieving referenced web resources of the hypertext markup language data object.

5. The method of claim 3, wherein the application directive specifies an associated content universal resource identifier (URI); and wherein obtaining a set of web content resources comprises executing content retrieval of the content URI.

6. The method of claim 5, wherein converting the rendered content comprises creating an image from the rendered content.

7. The method of claim 5, wherein converting the rendered content comprises creating a video from the rendered content over a duration of time.

8. The method of claim 5, wherein a parameter specified in the retrieved web content resources specifies a media format; and wherein converting the rendered content comprises selectively rendering to a media format from a set of output media resource formats that includes an image, video, and an original media format.

9. The method of claim 5, wherein executing content retrieval from the content URI comprises transmitting metadata associated with the application directive.

10. The method of claim 9, further comprising facilitating web content resource caching and session state management when executing content retrieval from the content URI.

11. The method of claim 10, wherein session state management scopes state according to endpoint-to-endpoint pairs and an expiration time.

12. The method of claim 9, wherein the metadata includes device information of the destination endpoint; wherein rendering the set of web content resources comprises rendering the set of web content resources according to the device information.

13. The method of claim 5, wherein the application directive specifies at least a second destination; and wherein the first set of web content is obtained, rendered, and transmitted to the first endpoint; and further comprising: obtaining a second set of web content resources associated with the second destination; rendering the second set of web content resources; converting the second rendered set of web content resources into a second media resource; and transmitting the second media resource to the second destination.

14. The method of claim 3, wherein transmitting the media resource to a destination according to the application directive comprises transmitting a multimedia messaging service (MMS) message.

15. The method of claim 3, wherein transmitting the media resource to a destination according to the application directive comprises transmitting the message through internet protocol messaging protocol.

16. The method of claim 3, wherein the headless browser lacks a browser graphical user interface.

17. A method for a communication platform comprising:
at the communication platform, processing a media message request, wherein the media message request is a request to transmit a media resource by obtaining at least one executable web content;
at the communication platform, obtaining at least one executable web content associated with the media message request;
at the communication platform, executing each executable web content to generate a respective dynamic web content;
at the communication platform, generating rendered content by rendering each dynamic web content using a headless browser;
at the communication platform, converting the rendered content into a media resource by creating at least one of audio, at least one image, and video from the rendered content; and
at the communication platform, transmitting the media resource to a destination endpoint according to the media message request,
wherein the headless browser lacks a browser graphical user interface, and
wherein each executable web content is executed by using the headless browser.

18. The method of claim 17, wherein the media message request is an application directive of a communication application of the communication platform.

19. The method of claim 17, wherein the media message request is an inbound application programming interface (API) request.

20. The method of claim 17, wherein the communication platform obtains each executable web content from an external server.

* * * * *